United States Patent
Palanciuc

(10) Patent No.: US 10,642,867 B2
(45) Date of Patent: May 5, 2020

(54) CLUSTERING BASED ON A DIRECTED GRAPH

(71) Applicant: Adobe Inc., San Jose, CA (US)

(72) Inventor: Virgil-Artimon Palanciuc, Bucharest (RO)

(73) Assignee: Adobe Inc., San Jose, CA (US)

( * ) Notice: Subject to any disclaimer, the term of this patent is extended or adjusted under 35 U.S.C. 154(b) by 299 days.

(21) Appl. No.: 15/706,115

(22) Filed: Sep. 15, 2017

(65) Prior Publication Data

US 2019/0087480 A1 Mar. 21, 2019

(51) Int. Cl.
```
G06F 16/28      (2019.01)
G06F 16/901     (2019.01)
G06Q 30/02      (2012.01)
G06F 16/23      (2019.01)
```

(52) U.S. Cl.
CPC ........ *G06F 16/285* (2019.01); *G06F 16/2379* (2019.01); *G06F 16/9024* (2019.01); *G06Q 30/0201* (2013.01)

(58) Field of Classification Search
CPC .............. G06F 16/285; G06F 16/9024; G06F 16/2379; G06Q 30/0201
USPC ....................................................... 707/737
See application file for complete search history.

(56) References Cited

U.S. PATENT DOCUMENTS

| | | | | |
|---|---|---|---|---|
| 6,321,362 B1 * | 11/2001 | Conn | .................... | G06F 17/505 716/108 |
| 6,714,975 B1 * | 3/2004 | Aggarwal | .............. | G06Q 30/02 709/224 |
| 7,974,938 B2 * | 7/2011 | Gupta | ...................... | G06N 5/02 706/59 |
| 8,922,559 B2 * | 12/2014 | Charles | ................ | G06K 9/6224 345/440 |
| 9,514,248 B1 * | 12/2016 | Guan | ...................... | H04L 29/06 |
| 9,852,230 B2 * | 12/2017 | Fleury | .................... | G06F 9/546 |

(Continued)

FOREIGN PATENT DOCUMENTS

| | | | | |
|---|---|---|---|---|
| GB | 2558947 A | * | 7/2018 | ......... G06Q 30/0201 |
| WO | WO-2006051760 A1 | * | 5/2006 | ......... G06F 17/5045 |

OTHER PUBLICATIONS

Balasubramanyan et al., "Node Clustering in Graphs: An Empirical Study", in WNADTA, 2010, 8 pages. (Year: 2010).*

(Continued)

*Primary Examiner* — Phuong Thao Cao

(74) *Attorney, Agent, or Firm* — Kilpatrick Townsend & Stockton LLP

(57) ABSTRACT

Various embodiments describe clustering of nodes of a directed graph based on the oriented edges of the directed graph and on a set of rules. In an example, each node represents a device identifier associated with a computing device. The device identifier facilitates an online activity provided by a computing service. A computing system accesses the directed graph and generates clusters that contain subsets of the nodes by at least iteratively updating the directed graph based on the set of rules. The set of rules specifies (i) removal of leaf nodes from the directed graph, (ii) reconnection of nodes that form a chain in the directed graph, and (iii) reconnection of nodes that form a split in the directed graph. The computing system also associates a client profile with a subset of the nodes contained in a cluster from the clusters.

19 Claims, 11 Drawing Sheets

(56) References Cited

U.S. PATENT DOCUMENTS

| | | | | | |
|---|---|---|---|---|---|
| 10,116,536 | B2* | 10/2018 | Palanciuc | | H04L 43/08 |
| 2002/0069229 | A1* | 6/2002 | Hailpern | | G06F 16/9558 |
| | | | | | 715/206 |
| 2005/0050012 | A1* | 3/2005 | Klein | | G06F 16/27 |
| 2009/0132975 | A1* | 5/2009 | Cheng | | G06F 17/505 |
| | | | | | 716/106 |
| 2011/0295856 | A1* | 12/2011 | Roitblat | | G06F 16/35 |
| | | | | | 707/737 |
| 2013/0013601 | A1* | 1/2013 | Kabiljo | | G06F 16/95 |
| | | | | | 707/737 |
| 2014/0074764 | A1* | 3/2014 | Duftler | | G06N 5/025 |
| | | | | | 706/47 |
| 2014/0207769 | A1* | 7/2014 | Marbach | | G06F 16/285 |
| | | | | | 707/723 |
| 2015/0195349 | A1* | 7/2015 | Cardamore | | H04W 4/70 |
| | | | | | 709/201 |
| 2015/0363644 | A1* | 12/2015 | Wnuk | | G06F 16/23 |
| | | | | | 382/103 |
| 2016/0019313 | A1* | 1/2016 | Chakrabarti | | G06F 16/9024 |
| | | | | | 707/798 |
| 2016/0180403 | A1* | 6/2016 | Ganesh | | G06Q 30/0269 |
| | | | | | 705/14.66 |
| 2016/0188635 | A1* | 6/2016 | Shah | | G06T 3/40 |
| | | | | | 348/207.1 |
| 2017/0076323 | A1* | 3/2017 | Palanciuc | | G06Q 30/0255 |
| 2017/0098245 | A1* | 4/2017 | Palanciuc | | G06F 16/285 |
| 2017/0134232 | A1* | 5/2017 | Palanciuc | | H04L 41/0893 |
| 2017/0141980 | A1* | 5/2017 | Palanciuc | | H04L 43/08 |
| 2017/0147675 | A1* | 5/2017 | Han | | G06F 16/35 |
| 2017/0147706 | A1* | 5/2017 | Roth | | G06F 16/9024 |
| 2017/0161281 | A1* | 6/2017 | Bhartia | | H04L 67/02 |
| 2017/0177740 | A1* | 6/2017 | Abaya | | G06F 3/0481 |
| 2017/0178270 | A1* | 6/2017 | Gersh | | G06Q 90/00 |
| 2017/0330357 | A1* | 11/2017 | Siegel | | G06F 16/338 |
| 2018/0211172 | A1* | 7/2018 | Kirk | | H04L 67/22 |
| 2018/0240042 | A1* | 8/2018 | Boada | | G06F 17/18 |
| 2019/0073410 | A1* | 3/2019 | Booker | | G06F 16/955 |
| 2019/0286657 | A1* | 9/2019 | Li | | G06F 16/906 |

OTHER PUBLICATIONS

Malliaros et al., "Clustering and Community Detections in Directed Networks: A Survey", Physics Reports, dated Aug. 6, 2013, 86 pages, accessed at <https://arxiv.org/pdf/1308.0971.pdf>. (Year: 2013).*

Schaeffer, S. E., "Survey: Graph Clustering", Computer Science Review I (2007): pp. 27-64. (Year: 2007).*

Kiveris et al., Connected Compnents in MapReduce and Beyond. [online] MMDS-Data.org, Jun. 2014 [retrieved on Dec. 3, 2017]. Retrieved from the Internet: <URL: mmds-data.org/presentations/2014_/vassilvitskii_mmdsl4.pdf>, 46 pages.

Malewicz et al., Pregel: A System for Large-Scale Graph Processing. *SIGMOD '10*, Jun. 6-11, 2010. [retrieved on Dec. 3, 2017]. Retrieved from the Internet: <URL: https://kowshik.github.io/JPregel/pregel_paper.pdf>, pp. 135-145.

* cited by examiner

CLUSTERING BASED ON A DIRECTED GRAPH

TECHNICAL FIELD

The application relates to clustering a large amount of data on a distributed computing system based on a directed graph and providing a customized computing service based on the clustering.

BACKGROUND

A user commonly operates multiple computing devices to access online services. For example, early in the day, the user logs in to a social media platform by using a smartphone. Upon arrival to work, the user turns a desktop computer on and browses various work-related online forums. Later in the day, the user enters a meeting room and operates a laptop for a virtual meeting with attendees at different geographic locations. When home in the evening, the user streams content via a tablet.

Each of the devices is typically associated with a number of device identifiers including, for instance, a cookie and an Internet protocol (IP) address. The device identifiers are used to customize the online services for the user. However, the customization would not be optimized across the different online services unless the different device identifiers are associated with the same user. For example, if one online service uses a cookie and another online service uses an IP address, and these two device identifiers are not detected as belonging to the same user, the customization can vary significantly between the two online services. For instance, the targeted content presented to the user across the two online services can be unrelated or even inconsistent. Hence, the overall quality of the online services is degraded because the user experience is not seamless and can vary significantly between the online services.

Accordingly, many existing systems associate device identifiers with users. Clustering is one usable technique to perform the association. Generally, the device identifiers are clustered such that the ones likely belonging to the same user are grouped together in the same cluster. The customization is then performed at a cluster level. In this way, as long as the device identifiers of a user belong to the same cluster, the different online services can be commonly customized for the user across the different computing devices. For example, whether accessing a social media platform, a work-related web site, a virtual meeting service, or online content via a smartphone, a desktop computer, a laptop, or a tablet, the same message or related messages can be inserted and presented to the user if the respective device identifiers are in the same cluster.

The computational burden on the existing system to cluster device identifiers is significantly large. Typically, millions if not billions of device identifiers should be processed because of the large number of users, each being associated with multiple device identifiers. Further, some of the users are web robots (e.g., Internet bots), each having thousands or more of device identifiers. To handle the computational burden, many existing systems rely on distributed computing.

In distributed computing, many computers are used. Each computer receives and processes data about a subset of the device identifiers. Processed data is exchanged between the computers to complete the clustering. Although this architecture is generally successful, it can fail under different scenarios. For example, when the subset of data allocated to a computer is too large, the computer may not have the memory space or the processing capability to handle the large amount of data and the clustering fails altogether. This scenario occurs, for instance, when some of the users, such as web robots, are associated with a very large number of device identifiers, resulting in skewed data and a distribution of a too large data amount to the same computer.

SUMMARY

Embodiments of the present disclosure describe clustering of device identifiers represented in a directed graph to support customization of online activities facilitated by the use of the device identifiers. In an example, a computing system accesses the directed graph. The directed graph is generated based on data associated with online activities of computing devices and includes nodes and oriented edges connecting the nodes. Each node represents a device identifier associated with one of the computing devices. The computing system generates clusters that contain subsets of the nodes by at least iteratively updating the directed graph based on a set of rules. The set of rules specifies (i) removal of leaf nodes from the directed graph, (ii) reconnection of nodes that form a chain in the directed graph, and (iii) reconnection of nodes that form a split in the directed graph. The computing system also associates a client profile with a subset of the nodes contained in a cluster from the clusters. An online activity of a computing device associated with a device identifier is customized according to the client profile based on a determination that the device identifier corresponds to a node from the subset of nodes associated with the client profile.

The directed graph representation and the set of rules provide various advantages over existing clustering systems as further discussed in connection with the figures. Briefly, the use of the directed graph can reduce the amount of data to be processed by up to fifty percent relative to the use of the undirected graph in the existing clustering systems. Further, the set of rules reduce the total amount of data that should be processed from the directed graph at each iteration and allow the identification of data skews, thereby improving the distribution of the data and processing between computers of a distributed computing system.

These illustrative examples are mentioned not to limit or define the disclosure, but to provide examples to aid understanding thereof. Additional embodiments and examples are discussed in the Detailed Description, and further description is provided there.

DETAILED DESCRIPTION

Figure 1:
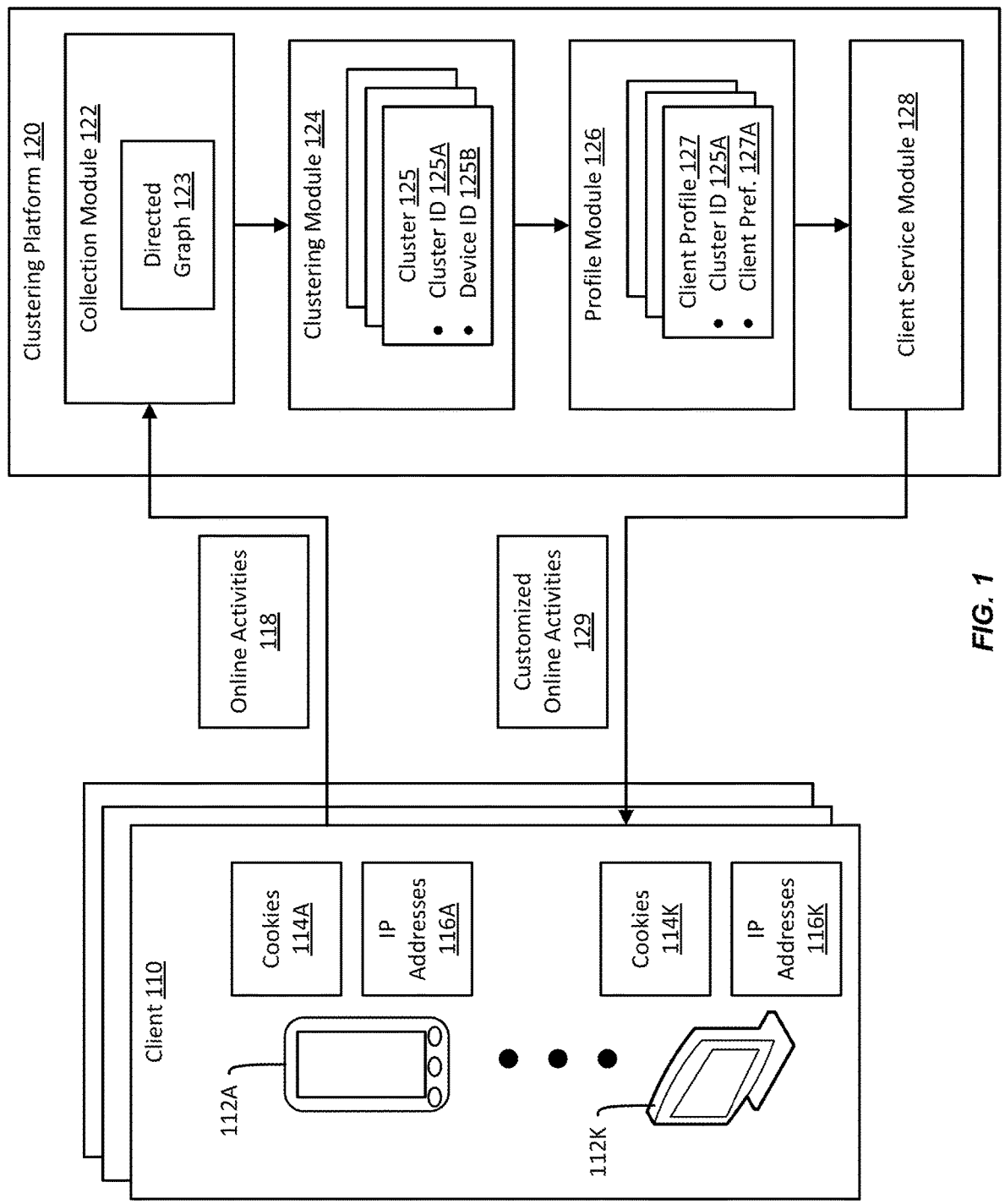
FIG. 1 is a diagram depicting an example of a computing environment for clustering data and providing a customized computing service according to certain embodiments.

Embodiments of the present disclosure are directed to, among other things, clustering a large amount of data on a distributed computing system based on a directed graph and providing a customized computing service based on the clustering. In an example, the data represents device identifiers of users accessing online services. Relevant to the clustering, the embodiments involve representing the data as nodes and oriented edges in the directed graph and iteratively updating the directed graph based on a set of rules. Each node is assigned a label and corresponds to a device identifier. At each iteration a set of labels is maintained and leaf nodes are removed from the directed graph and their labels are added to the set. Oriented edges between the remaining nodes are also modified to further reduce the size of the directed graph. Once the iterations are complete, back propagation is used to process the different sets from the last iteration to the first iteration. The back propagation matches labels across the sets such that, at the end of the back propagation, a final label is propagated to a subset of the nodes. Each final label represents an identifier of a cluster that groups the nodes from the corresponding subset.

Upon completing the clustering, each cluster is identified by a label and groups a set of nodes corresponding to device identifiers that likely belong to the same user. The label is added to a profile of the user based on prior knowledge about the user. For instance, if any of the device identifiers is already known to belong to the user, the remaining device identifiers become associated with the user by adding the label of the cluster to the user's profile. Accordingly, when the user operates two computing devices to access the same or different online services (e.g., a desktop computer and a tabled to access a web site and/or a video stream service), a determination is made that the corresponding device identifiers belong to the same user based on matching the device identifiers to the cluster. The user's access) is customized in a similar way across the computing devices to provide a common user experience (e.g., consistent messages are inserted in targeted content).

Relevant to performing the clustering on a distributed computing system, the embodiments involve using key-value pairs to distribute the clustering. In the directed graph, a first node is connected to a second node, each of which is assigned a label. A key-value pair is generated for the two connected nodes. The key corresponds to the label of the first node and the value corresponds to the label of the second node. In this way, the key-value pair indicates that the first node is connected to the second node. By using key value-pairs as the form of the data representation and storage and by performing the above clustering, identifying data skews and avoiding the distribution of a too large data amount to a single computer become possible, as further described in connection with the next figures. Hence and unlike existing systems, the clustering is successful even when a data skew exists (e.g., when one of the users is a web robot that has thousands or more of device identifiers).

The embodiments of the present disclosure provide many advantages over existing systems. For example, the clustering is accurately performed, while reducing the needed data processing and storage. Hence, the overall quality of the service customization and the user experience are improved based on accurately associating device identifiers with users. Further, in existing systems, clustering can be performed on a distributed computing system. As further discussed in connection with FIG. 2, the clustering can involve the processing of a significant amount of data, in the terabyte range. In such situations, the existing clustering techniques can fail even on the distributed computing system because of data skews. A data skew would necessitate a distribution of a large amount of data to a single computer, where the amount is larger than the available memory space of the computer and/or could not be handled by the processors of the computer. In contrast, the embodiments of the present disclosure can reduce the amount of data by up to fifty percent by using a directed graph representation. Further, the embodiments can reduce the number of clustering iterations and can, at each iteration, reduce the amount of data to be processed based on a set of rules. Additionally, data skews can be identified and handled as an exception. By doing so, the clustering can be more efficiently processed on a distributed computing system.

In an illustrative example, online activities of users are analyzed. Each user operates a number of computing devices to access online services, where the access is facilitated via cookies. In this example, a cookie represents a device identifier. A directed graph is generated based on the online activities. Each node corresponds to a cookie. An oriented edge connecting two nodes indicates that the two corresponding cookies likely belong to a same user. Numerical values are used as labels and are assigned to the nodes. The labels are stored in key-value pairs in a way that preserves the representation of the nodes and oriented edges. The key-value pairs are distributed on the computing system, where each computer processes key-value pairs having keys falling within a predetermined range of numerical values. The clustering is iteratively performed by removing leaf nodes, reconnecting remaining nodes, and creating sets of labels based on a set of rules. Through back propagation, subsets of the nodes are assigned a same label. Accordingly, a same label propagated to a subset of nodes indicates that these nodes belong to a same cluster. For instance, when a same numerical value is propagated to nine nodes from the millions of nodes in the directed graph, these nine nodes belong to the same cluster. Thus, the nine cookies corresponding to the nine nodes are associated with a same user. In this way, regardless of which of the nine cookies is used to access an online service, the access can be customized in a same or similar way. For instance, when one cookie is used with visiting a social media platform on a smartphone, and when another cookie is used with streaming online content on a tablet, a same targeted content (e.g., advertisement) can be provided in web spaces on both computing devices.

In the interest of clarity of explanation, embodiments of the present disclosure are described in connection with online activities, cookies, and IP addresses. However, the embodiments are not limited as such. The embodiments similarly apply to analyzing any type of activity that can be tracked and represented in a directed graph regardless of whether the activity is online or offline and whether it relates to interacting with one computer system, multiple computer systems, or other types of system. Cookies and IP addresses are mere examples of device identifiers and other types of device identifiers are possible. A device identifier is generally an identifier that identifies a device, an application running on a device, and/or a user of the device.

As used herein, the term "directed graph" represents a structure that captures relationships between objects by representing the objects as nodes and the relationship as edges connecting the nodes, and where the edges have a direction associated with them. An oriented edge that connects a first node to a second node indicates a relationship directed from the first node to the second node.

As used herein, the term "leaf node" represents a node in a directed graph, where the node has an oriented edge that connects it to another node but does not have an oriented edge that connects another node to it.

Various types of connections are possible within a directed graph. The rules applied in the iterative update of the directed graph depend on the type of connection, as further described in connection with the next figures.

As used herein, a "chain connection" represents a connection where a first oriented edge connects a first node to a second node and a second oriented edge connects the second node to a third node. For simplicity, this connection may be described as the first node being connected to the second node and, in turn, the second node being connected to the third node. The first, second, and third nodes are chained in this order (e.g., first to second and second to third).

As used herein, a "split connection" represents a connection where a first oriented edge connects a first node to a second node and a second oriented edge connects the first node to a third node. For simplicity, this connection may be described as the first node being connected to the second node and to the third node. A split exists because the first node sits between the two other nodes and have oriented edges outward to them.

As used herein, a "star connection" represents a connection where a first oriented edge connects a second node to a first node and a second oriented edge connects a third node to the first node. For simplicity, this connection may be described as the second node and the third node being connected to the first node. A star exists because the first node sits between the two other nodes and have oriented edges directed inward to it.

FIG. 1 is a diagram depicting an example of a computing environment for clustering data and providing a customized computing service according to certain embodiments. In an embodiment, the computing environment includes a number of clients 110 and a clustering platform 120. The clustering platform 120 generates clusters based on device identifiers associated with the clients 110. The clusters are used to customize online activities of the clients 110.

In an example, a client 110 represents a human user or an automated process, such as a web robot, and operates a number of computing devices to access various online services, such as accessing social media platforms, browsing web sites, streaming media, exchanging documents, conducting electronic transactions, and other types of online services. Access to an online service represents an online activity. Different types of computing devices are possible including, for example, personal computing devices such as a smartphone, a desktop computer, a laptop, or a tablet and, in another example, more sophisticated devices such as a server, a cluster of servers, or a virtual computing resource like a virtual machine or a collection of virtual machines. Each of such computing devices is associated with a set of device identifiers, such as cookies and IP addresses. In many situations, the device identifiers facilitate the access to the online services.

As illustrated in FIG. 1, a client 110 operates "K" computing devices shown as computing devices 112A-112K, where "K" is a positive integer. Each of the computing devices is associated with a number of cookies and/or a number of IP addresses. For instance, the computing device 112A is a smartphone having cookies 114A (e.g., authentication cookies, cookies specific to visited web sites, etc.) and IP addresses 116A (e.g., an IP address for a WiFi connection and an IP address for a cellular connection). Similarly, the computing device 112K is a desktop computer also having a number of cookies 114K and a number of IP addresses 116K.

In an example, the clustering platform 120 represents a computing platform that implements computing modules to cluster device identifiers and maintain client profiles based on the clustering. The configuration and operations of such modules are further described in connection with the next figures. Generally, a distributed computing system hosts the clustering platform 120 to allow the distribution of some or all of the modules across different computing resources of this system (e.g., different computers, servers, and the like). Apache Spark, an open-source cluster-computing framework available from the APACHE SOFTWARE FOUNDATION, is an example of a distributed computing system that can host the clustering platform 120.

As illustrated in FIG. 1, the clustering platform 120 implements collection module 122, a clustering module 124, a profile module 126, and a client service module 128. Generally, the collection module 122 collects data about online activities 118 of the clients 110 and generates a directed graph 123 based on the data. The clustering module 124 generates clusters 125 based on the directed graph 123. The profile module 126 maintains a profile 127 for each client 110 based on the device identifiers grouped together in a cluster 125 associated with that client 110. The client service module 128 facilitates various computing services for the client 110 based on the client profiles 127.

In an example, the collection module 122 is implemented as part of a collection server of the clustering platform 120. Nonetheless, the collection server can be a server of a third party, in which case accessing the data includes a data import from the collection server to the clustering platform 120 The collection server collects and tracks data that represent the online activities 118. This data include the various device identifiers 114A-116K of the clients 110. The collection module 122 analyzes the data and generates the directed graph 123 based on observations from the data about how the device identifiers are used in conjunction in the online activities 118. For example, two nodes of the directed graph 123 represent two different identifiers and are connected via an oriented edge when the observations indicate that the two devices identifiers have been used on a same device or in association with a same user account to access one or more online services.

The clustering module 124 analyzes the directed graph 123 and generates clusters 125 based on the analysis. Each cluster 125 is identified with a cluster identifier 125A (e.g., a label propagated to the cluster as described in connection with the next figures) and contains a set of device identifiers 125B that likely belong to a same client 110 (e.g., the cookies 114A-114K and/or the IP addresses 116A-116K belonging to the same client 110 are grouped in a same cluster 123). In an example, the clustering module 124 accesses the directed graph 123 and performs iterative clustering based on a set of rules, and completes the clustering based on back propagation of labels to generate the clusters 125 as further described in connection with the next figures.

The profile module 126 associates each cluster 125 with a client profile 127. For instance, each cluster identifier 12A is is added to the relevant client profile 127. Accordingly, a client profile 127 includes an identifier 125A of a cluster 125 and other information relevant to a client 110, such as client preferences 127A, prior customizations performed for the client 110 (e.g., advertisement contents that were provided, interactions of the client 110 with the advertisement contents, and the like).

The client service module 128 interfaces with computing devices of the clients 110 or with computing resources providing computing services (e.g., such as servers providing online services like web site hosting) to customize the access of the clients 110 to the computing services. For example, the client service module 128 detects a device identifier used by a client 110 to access a particular computing service, matches this device identifier to one of the clusters 125, matches the relevant cluster identifier 125A to one of the client profiles 127, accesses the client preferences 127 of the matched client profile 127, and accordingly customizes the particular computing service for the client 110. Hence, the clustering platform 120 facilitates customized online activities 129 to the clients 110. Various types of customization are possible. In one example, targeted content, such as advertisement, is provided to a client 110. In another example, computing sessions, such as the look and feel of a web page or a web portal, are made similar across the different computing devices of the client 110.

Accordingly, in the computing environment of FIG. 1, the online activities 118 of the clients 110 can be tracked using the relevant device identifiers. The device identifiers are grouped in clusters 125, each associated with a client profile 127. Rather than customizing a computing service for a client 110 at a device identifier level, the computing service is customized at the cluster level according to the client profile 127. Hence, regardless of which device identifier is used by the client 110 to access an online service, the client 110 can experience a common type of customization across the various online services on its different computing devices.

Figure 2:
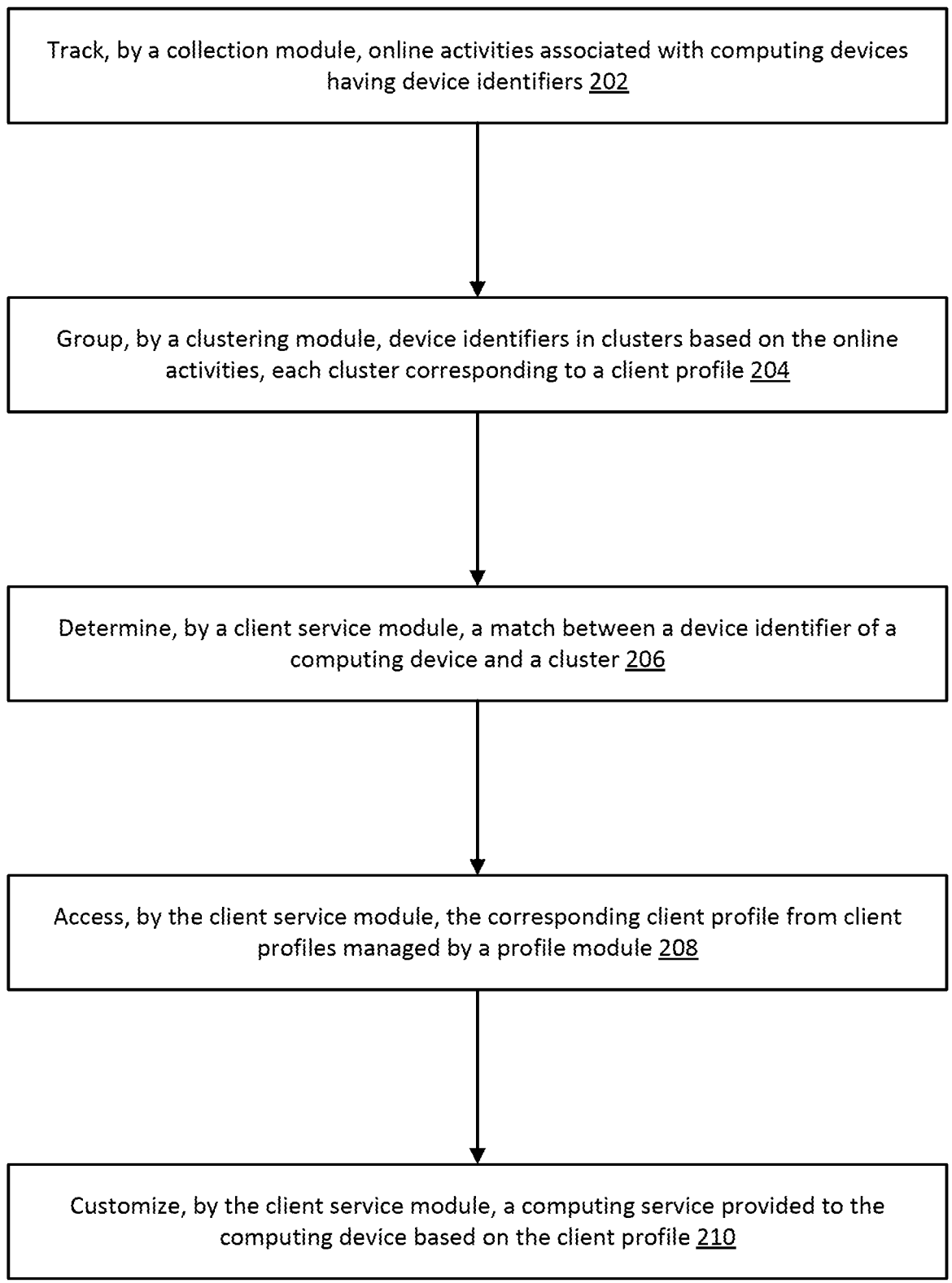
FIG. 2 is a diagram depicting an example of a flow for providing a customized computing service based on clustering of data according to certain embodiments.

FIG. 2 is a diagram depicting an example of a flow for providing a customized computing service based on clustering of data according to certain embodiments. A computer system may be configured to perform the illustrative flow. For example, the computer system can be a distributed computing system that hosts the clustering platform 120 of FIG. 1. Instructions for performing the operations of the illustrative flow can be stored as computer-readable instructions on a non-transitory computer-readable medium of the computer system. As stored, the instructions represent programmable modules that include code or data executable by a processor of the computer system. The execution of such instructions configures the computer system to perform the specific operations shown in the figure and described herein. Each programmable module in combination with the processor represent a means for performing a respective operation(s). While the operations are illustrated in a particular order, it should be understood that no particular order is necessary and that one or more operations may be omitted, skipped, and/or reordered.

The example flow of FIG. 2 starts at operation 202, where the computer system tracks online activities associated with computing devices having device identifiers. In an example, the computer system includes a collection server that implements a collection module (e.g., the collection module 122 of FIG. 1). Data is collected and analyzed to generate a directed graph, where the data describes the online activities and specifying the device identifiers. In another example, the computer system imports such data from a third party collection server.

At operation 204, the computer system groups device identifiers based on the online activities, where each of the clusters corresponds to a client profile. In an example, the computer system implements a clustering module (e.g., the clustering module 124 of FIG. 1), accesses the directed graph, and applies a set of rules to the directed graph to iteratively generate the clusters. Each node in the directed graph represents a device identifier. Each cluster groups a subset of nodes from the directed graph, thereby representing a grouping of device identifiers potentially belonging to a same client.

At operation 206, the computer system determines a match between a device identifier of a computing device of a client and a cluster. In an example, the device identifier is used to access a computing service, such as an online service like a web site, social media platform, or other online services. The computer system implements a client service module (e.g., the client service module 128 of FIG. 1) that detects the device identifier and determines that this device identifier is represented in a node that belongs to a cluster. Accordingly, the device identifier is matched to the cluster.

At operation 208, the computer system accesses a client profile that corresponds to the cluster. In an example, the client service module uses the identifier of the cluster to look up the various client profiles and selects the one that includes a matching identifier. The client profiles are managed by a profile module of the computer system (e.g., the profile module 126 of FIG. 1). Each client profile includes an identifier of a cluster, thereby indicating that the device identifiers corresponding to the cluster belong to the same client. The client service module retrieves information about the client usable to customize the computing service, such as user preferences and/or a history of customization.

At operation 210, the computer system customizes the computing service provided to the computing device based on the client profile. For example, the client service module inserts targeted content in a space of an accessed web site. In another example, the look and feel of the web site is customized.

Figure 3:
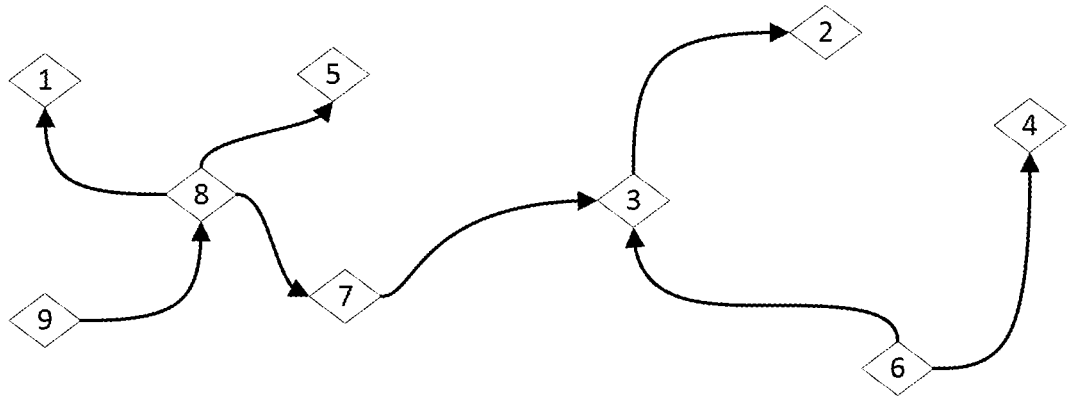
FIG. 3 is a diagram depicting an example of clustering nodes based on a directed graph according to certain embodiments.

FIG. 3 is a diagram depicting an example of clustering nodes 310 based on a directed graph 320 according to certain embodiments. In an embodiment, a computing system, such as the one hosting the clustering platform 120 of FIG. 1 accesses and processed data represented in the directed graph 320 to generate the clustered nodes 310.

As illustrated, the directed graph 320 includes nine nodes connected with oriented edges. Each node corresponds to a device identifier, such as a cookie used by a computing device to access an online service. Each oriented edge indicates a relationship from one node to another connected node, such as an indication that the two corresponding cookies likely belong to a same client and not necessarily the same computing device. Of course, a larger number of nodes is possible and can form sets that are not connected. In a typical application of providing a customized online service, there can be millions if not billions of nodes and, likewise, millions if not billions of connections. This results in a large amount of data, in a range of terabytes, that cannot fit in the memory of a single computer.

The nodes are labeled. In an example, a numerical value is used as a label and the numerical values are assigned to the nodes in an arbitrary or specific order (e.g., an ascending order). As illustrated, the nine nodes are labeled "1" through "9."

In an example, the clustered nodes 310 are generated by processing the directed graph 320 as a union of stars. For instance, a set of connected nodes from the directed graph 320 become connected to the same, single "parent node." The clustered nodes 310 form a union star centered around the same, single "parent node." The label of the "parent node" can be used as the identifier of the clustered nodes 310.

As illustrated, nodes "1" through "9" form a set of connected nodes in the directed graph 320. These connections are rewritten such that each of the nodes "2" through "9" become connected to node "1." Node "1" acts as the parent node, and its label "1" can be used as the identifier of the clustered nodes "1" through "9."

The processing of the directed graph 320 to generate the clustered nodes 310 is further illustrated in the next figures. To better understand this processing, an explanation of existing techniques is described herein next.

In one technique, label propagation is used but no union of stars is formed. A label, such as a numerical value, is assigned to each node. For each node, the neighboring, connected nodes are analyzed to determine the smallest label (e.g., the minimum numerical value). The smallest label is propagated to the node. The propagation process is repeated until no further propagation is possible. The nodes having the same minimum label belong to a same cluster.

For instance, and referring to the directed graph 320, node "8" has four neighboring nodes (e.g., nodes directly connected to it): nodes "1", "5," "7," and "9." The smallest label of these five nodes (including node "8") is "1." Accordingly, in one propagation iteration, the "1" label is propagated to node "8," which now becomes labeled as node "1." The propagation is repeated at multiple iterations, and all nine nodes become labeled with "1." Label "1" becomes an identifier of a cluster that contains the nine nodes.

In this technique, the number of iterations depends on the longest chain of connected nodes. If this chain includes "N" nodes, the propagation is typically repeated "N−1" times. For instance, with the nine connected nodes of the directed graph 320, the longest chain has six nodes (e.g., nodes "1" to "8," "8" to "7," "7" to "3," "3" to "6," and "6" to 4"). Accordingly, five iterations are needed to propagate the "1" label to the nodes. Hence, in a directed graph that includes millions if not billions of nodes, the iterative label propagation of this technique becomes computationally extensive and, in many situations, the computational burden is too large to be successfully handled in a computing system, even in a distributed computing framework.

In a second technique, an undirected graph is iteratively processed to form a union of stars. The processing attempts to remove redundancy from the undirected graph (e.g., any redundant data about connections). To do so, the undirected graph is iteratively rewritten by reconnecting nodes such that the minimal number of connections is maintained at each iteration. At each iteration, two operations are repeated: "LargeStar" and "SmallStar." The "LargeStar" operation strictly connects larger neighboring nodes with the minimum neighboring nodes (where the sizes large and small refer to the numerical value of the label). For instance, assume that node "8" is connected with nodes "1" and "9" in an undirected manner. Node "1" becomes connected with node "9," and the connections between node "8" and each of nodes "1" and "9" are removed. The "Small Star" operation connects all smaller neighboring nodes with the minimum neighboring node. For instance, assume that node "8" is connected with nodes "1," 5," "7," and "9" in an undirected manner. Node "5," "7," and "8" become connected with node "1" and the connections between node "8" and node "9" are removed.

This second technique decreases the computational burden exponentially relative to the first technique by reducing the number of connections at each iteration and the total number of iterations. However, this second technique can still fail even when performed on a computing system. That is because a data skew may exist and would result in loading a too large amount of data to a computer memory. For instance, a web robot can be associated with a very large number of cookies. Under this second technique, data representative of the corresponding nodes and connections between them is significantly large (in the thousands if not millions or billions of nodes and connections) and would be loaded on the same computer memory. When the data is too large to fit on the memory, the processing would fail.

In comparison to the first technique, embodiments of the present disclosure involve forming a union star, thereby exponentially reducing the computational burden. In comparison to the second technique, the embodiments involve using a directed graph (as opposed to an undirected graph). The use of the directed graph provides various advantages. One advantage is significantly reducing the amount of data, by up to fifty percent. For example, key-value pairs are used for the processing on a distributed computing system. If an undirected graph is used, two key-value pairs would be stored per two connected nodes: a first key-value pair for the connection from the first node to the second node and a second key-value pair for the connection from the second node to the first node. In comparison, if a directed graph is used, only one key-value pair would be stored per the two connected nodes.

Another advantage includes the capability of defining specific rules given the orientation of the connections in the directed graph (e.g., the oriented edges). The rules can further reduce the total number of iterations and the amount of connections to be analyzed per iteration. For instance, and as described in connection with the next figures, the rules enable iterating only on a subset of the graph at each iteration, and recomposing the final result. By doing so, distribution of the processing on the underlying computing system becomes more manageable. Recognizing data skews is also possible, and the rules specify how such skews should be handled.

Further, although the first or second technique can handle general-form graphs, the embodiments of the present disclosure can be implemented for a specific optimization targeted to bipartite graphs. For example, the rules specify changes to connections between partitions of the bipartite graph to generate a directed graph. These and other advantages of the embodiments are further illustrated in connection with the next figures.

Figure 4:
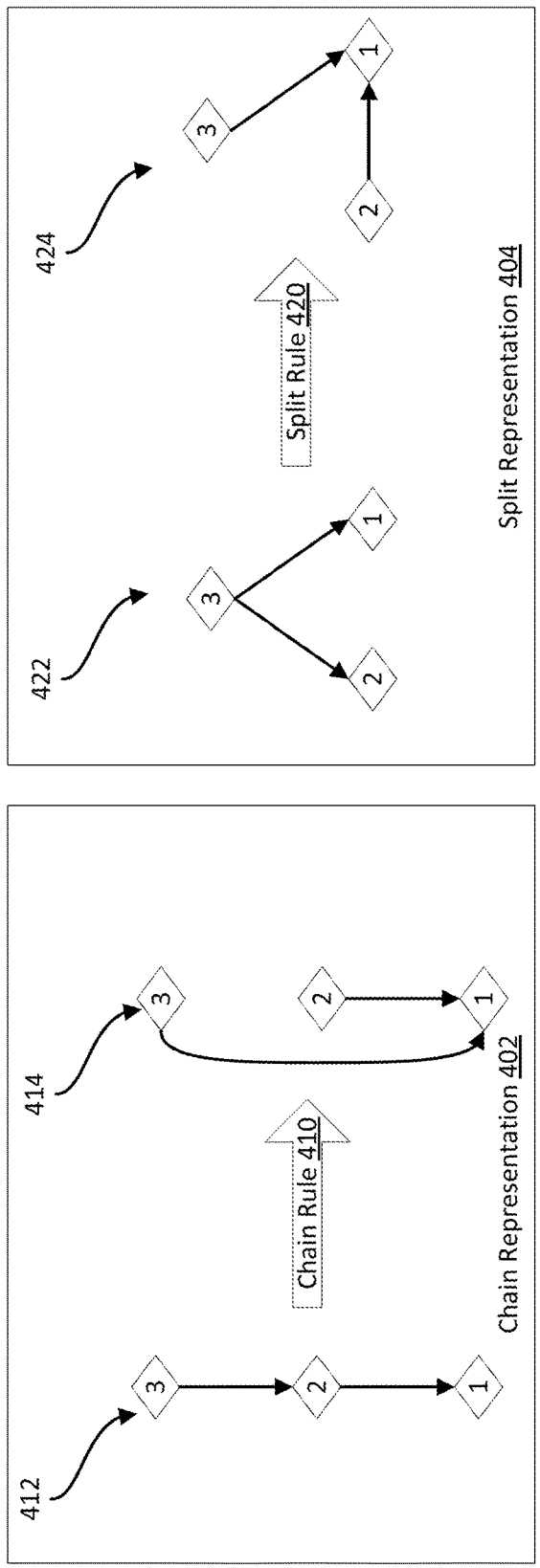
FIG. 4 illustrates an example of reconnecting nodes in a directed graph based on a set of rules according to embodiments of the present disclosure.
Figure 4:
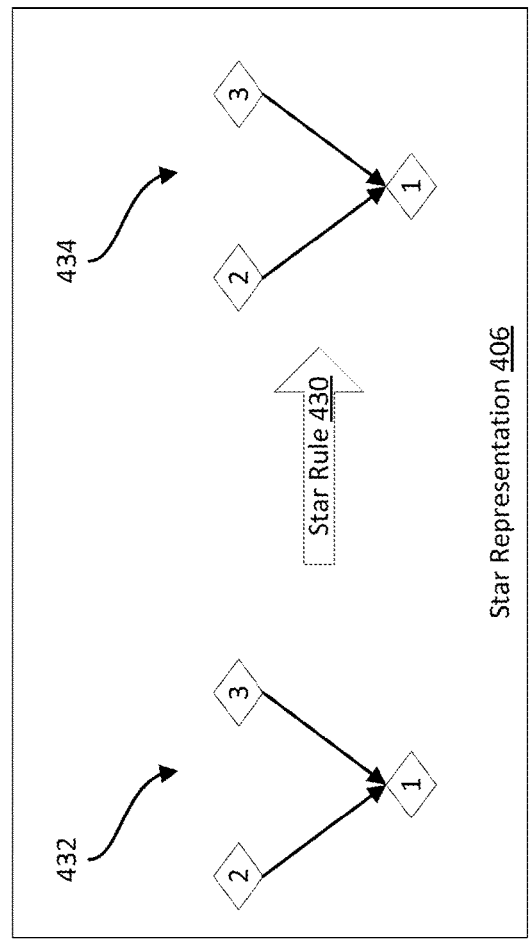

FIG. 4 illustrates an example of reconnecting nodes in a directed graph based on a set of rules according to embodiments of the present disclosure. Multiple rules are possible and are generally specified to reduce the number of oriented edges in the directed graph without losing knowledge about the connections between the nodes.

A global rule relates to the labeling of the nodes and, as applicable, generating a directed graph from an undirected graph. In an example, numerical values are assigned to the nodes in a graph. According to the global rule, an oriented edge is directed from a larger node to a smaller neighboring node. Accordingly, if an undirected graph is initially accessed, the global rule enables generating a directed graph by assigning the particular labels. "Large" and "small" are described relative to the numerical value, where a first node is larger than a second node and the second node is smaller than the first node indicate that the label of the first node is a numerical value larger than the label of the second node. A "neighboring node" refers to a node that is directly connected with another node. For instance, when a first node is connected to a second node, the second node to a third node, the second node is the neighboring node (or simply, the neighbor) of the first node, and the third node is the neighbor of the second node but not the first node. At a data representation level, the global rule is interpreted to generate key-value pairs. The key and the value of a key-value pair correspond to two connected nodes having two respective labels. The key is set as the smallest of the two labels and the value is set as the largest of the two labels.

In addition to the global rule, the rules can specify specific reconnections of nodes. For example, a chain rule 410, a split rule 420, and a star rule 430 are defined to handle chain connections, split connections, and star connections, respectively, as illustrated in FIG. 4.

A chain connection generally connects one node to another node, which, in turn, is connected to yet another node. As illustrated in the chain representation 402 of FIG. 4, node "3" is connected to node "2," which is connected to node "1." In this case, nodes "3," "2," and "1" form a chain connection 412: "3"→"2"→"1."

The chain rule 410 specifies that oriented edges should be rewritten to the smallest node in a chain connection (the larger nodes should be connected to the smallest node). In this way, the chain connection could be rewritten to form a star connection, where the star connection is directed to the smallest node of the chain connection. Specific to the chain connection 412, the chain rule 410 specifies that (a) node "3" should be reconnected to the node "1" (such that node "1" becomes the neighbor of node "3"), (b) the oriented edge between node "3" and node "2" should be removed (such that node "2" is no longer the neighbor of node "3"), and (c) the oriented edge between node "2" and node "1" should be preserved (such that node "1" remains the neighbor of node "2"). In this way, the chain "3"→"2"→"1" is remapped to a star connection 414: "3"→"1" and "2"→"1."

The chain rule 410 also applies to situations where one node has many "child" nodes. For example and referring back to the chain representation 402, assume that node "2" has another neighboring node "0." Both nodes "1" and "0" could be referred to as child nodes of node "2." In this case, two chain connections are formed: "3"→"2"→"1" (e.g., the chain connection 412) and "3"→"2"→"0." Because the chain rule 410 specifies reconnection to the smallest node, node "3" would be connected to node "0" instead of node "1." In this case, the two chain connections would be remapped to "3"→"0" and "2"→"0."

A split connection separately connects one node to other nodes. As illustrated in the split representation 404 of FIG. 4, node "3" is connected to node "2" and to node "1." In this case, nodes "3," "2," and "1" form a split connection 422: "3"→"2" and "3"→"1."

The split rule 420 specifies that oriented edges should be rewritten to form a star connection from the split connection, where the star connection is directed to the smallest node of the split connection. Specific to the split connection 422, the split rule 420 specifies that (a) node "2" should be reconnected to node "1" (such that node "1" becomes the neighbor of node "2"), (b) the oriented edge between node "3" and node "2" should be removed (such that node "2" is no longer the neighbor of node "3"), and (c) the oriented edge between node "3" and node "1" should be preserved (such that node "1" remains the neighbor of node "3"). In this way, the split "3"→"2" and "3"→"1" is remapped to a star connection 424: "3"→"1" and "2"→"1."

The split rule 420 similarly applies to a split of more than three nodes. For example and referring back to the split representation 404, assume that node "3" has more than two child nodes (e.g., in addition to child nodes "2" and "1," node "3" is connected to a node "0" forming the split of three"→"2," "3"→"1," and "3"→"0"). In this case, because the split rule 420 specifies reconnection to the smallest node, each of nodes "2" and "1" would be connected to node "0." This results in forming a star connection: "3"→"0," "2"→"0," and "1"→"0."

A star connection separately connects multiple nodes to a common node. As illustrated in the star representation 406 of FIG. 4, node "2" is connected to node "1" and node "2" is connected to node "1." In this case, nodes "3," "2," and "1" form a star connection 432: "3"→"1" and "2"→"1."

The star rule 430 specifies that oriented edges of a star connection should be preserved. In other words, no modification to the star connection is needed and all such modifications could be avoided. Specific to the star connection 432, the star rule 430 specifies that (a) node "2" should stay connected to node "1" (such that node "1" stays being the neighbor of node "2") and (b) node "3" should stay connected to node "1" (such that node "1" stays being the neighbor of node "3"). In this way, the star ""3"→"1" and "2"→"1" remains the same as a star connection 434: "3"→"1" and "2"→"1."

The star rule 430 similarly applies to a star of more than three nodes. For example and referring back to the star representation 406, assume that a node "4" is also connected to node "1." In this case, because the star rule 430 specifies that no modification is needed the star connection is maintained: "4"→"1," "3"→"1," and "2"→"1."

Figure 5:
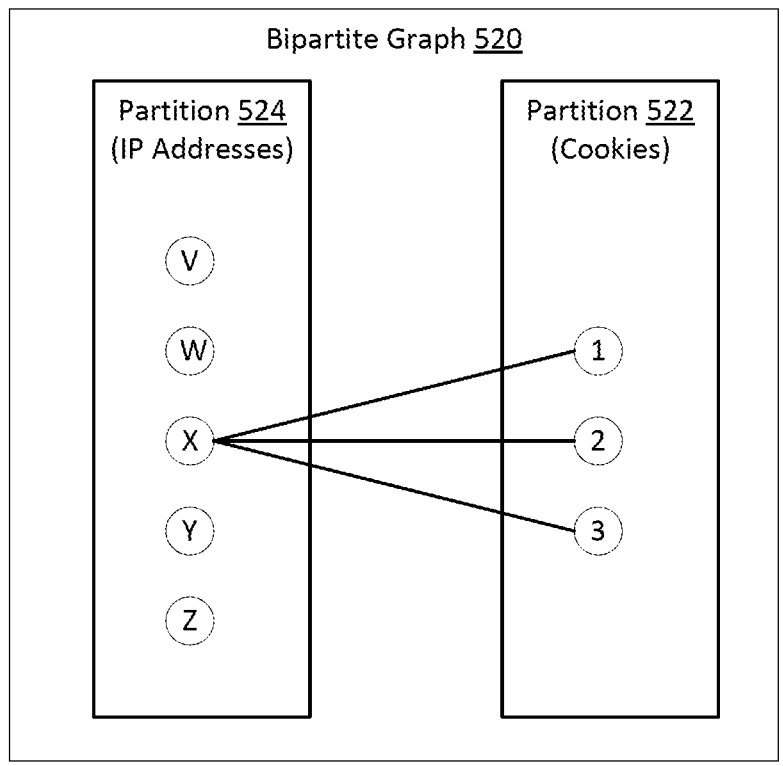
FIG. 5 illustrates an example of generating a portion of a directed graph from a bipartite graph according to embodiments of the present disclosure.
Figure 5:
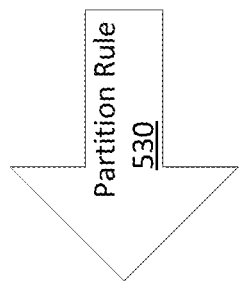
Figure 5:
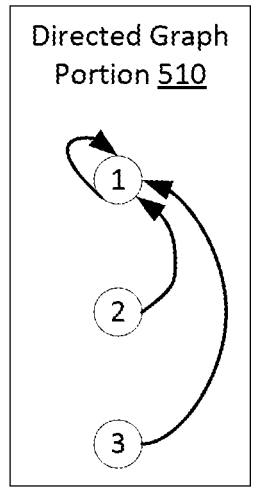

FIG. 5 illustrates an example of generating a portion 510 of a directed graph from a bipartite graph 520 according to embodiments of the present disclosure. In an example, a partition rule 530 is specified to generate the portion 510 based on the connections between the partitions of the bipartite graph 520 without losing knowledge about the connections.

In an example, the bipartite graph 520 includes two partitions 522 and 524, each corresponding to a specific type of device identifiers. As illustrated, the first partition 522 contains a set of nodes, each representing a cookie. The second partition 524 contains a set of nodes, each representing an IP address. Edges connect nodes from the second partition 524 to the first partition 522. For example, a node representing an IP address in the second partition 524 is connected to three nodes representing three different cookies in the first partition 522. In the illustration of FIG. 5, "X," "1", "2," and "3" represent labels assigned to the nodes.

In an example, the partition rule 530 is specified such that the minimal number of connections between nodes of a partition of interest is generated to maintain knowledge gained based on the connection between the two partitions 522 and 524. For example, because node "X" (e.g., the IP address "X") of the second partition 524 is connected with nodes "1", "2," and "3" (e.g., cookies "1", "2," and "3") of the first partition 522, the three cookies "1", "2," and "3" are indirectly connected (e.g., are used on the same computing device having IP address "X" and, thus, likely belong to a same client). These indirect connections represent knowledge gained from the direct connections between the two partitions 522 and 524.

In this example, the second partition 522 is of interest. Accordingly, the portion 510 of the directed graph is generated by including the nodes of the second partition 522 and by creating connections between such nodes, where the connections retain the knowledge. In this case, the partition rule 530 specifies that (a) connection "X" with "1" should be remapped to a self-connection (e.g., node "1" to node "1"), (b) connection "X" with "2" should be remapped to a connection from node "2" to node "1"), and (c) connection "X" with "3" should be remapped to a connection from node "3" to node "1." The orientation of these connections (e.g., from "2" to "1" and "3" to "1") follows the global rule described in connection with FIG. 4. In other words, any oriented edge flows from a node with a larger label to a node with a smaller label. Hence, a set of rules including the partition rule 510 and the global rule specifies that (a) a selection of a partition of interest should be selected from the bipartite graph and (b) a minimum number of oriented edges should be maintained for the nodes in the directed graph (where these nodes are also found in the partition of interest) based on the connections between the nodes and the other partition of the bipartite graph.

Figure 6:
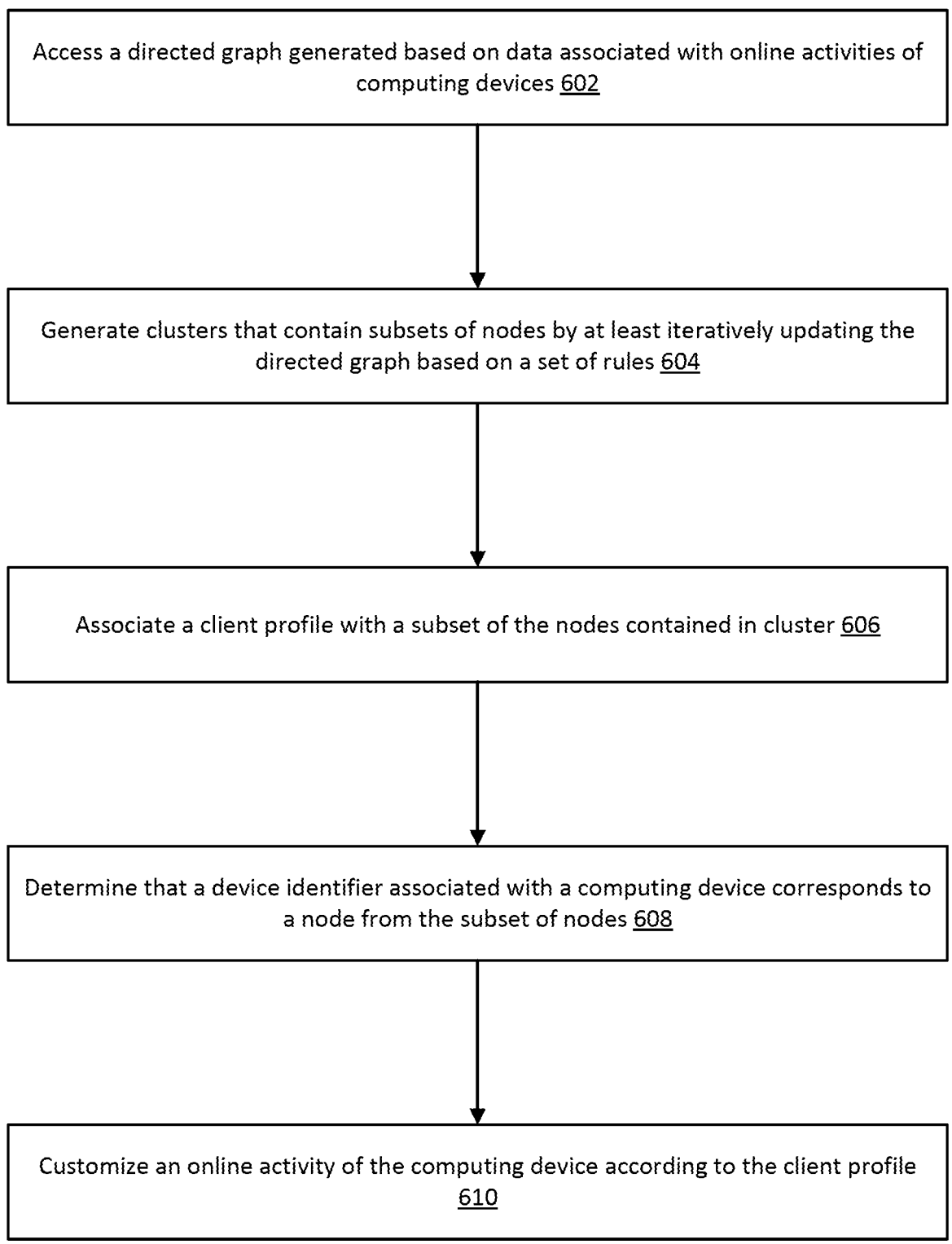
FIG. 6 illustrates an example of a flow for clustering data and providing a customized computing service according to embodiments of the present disclosure.
Figure 7:
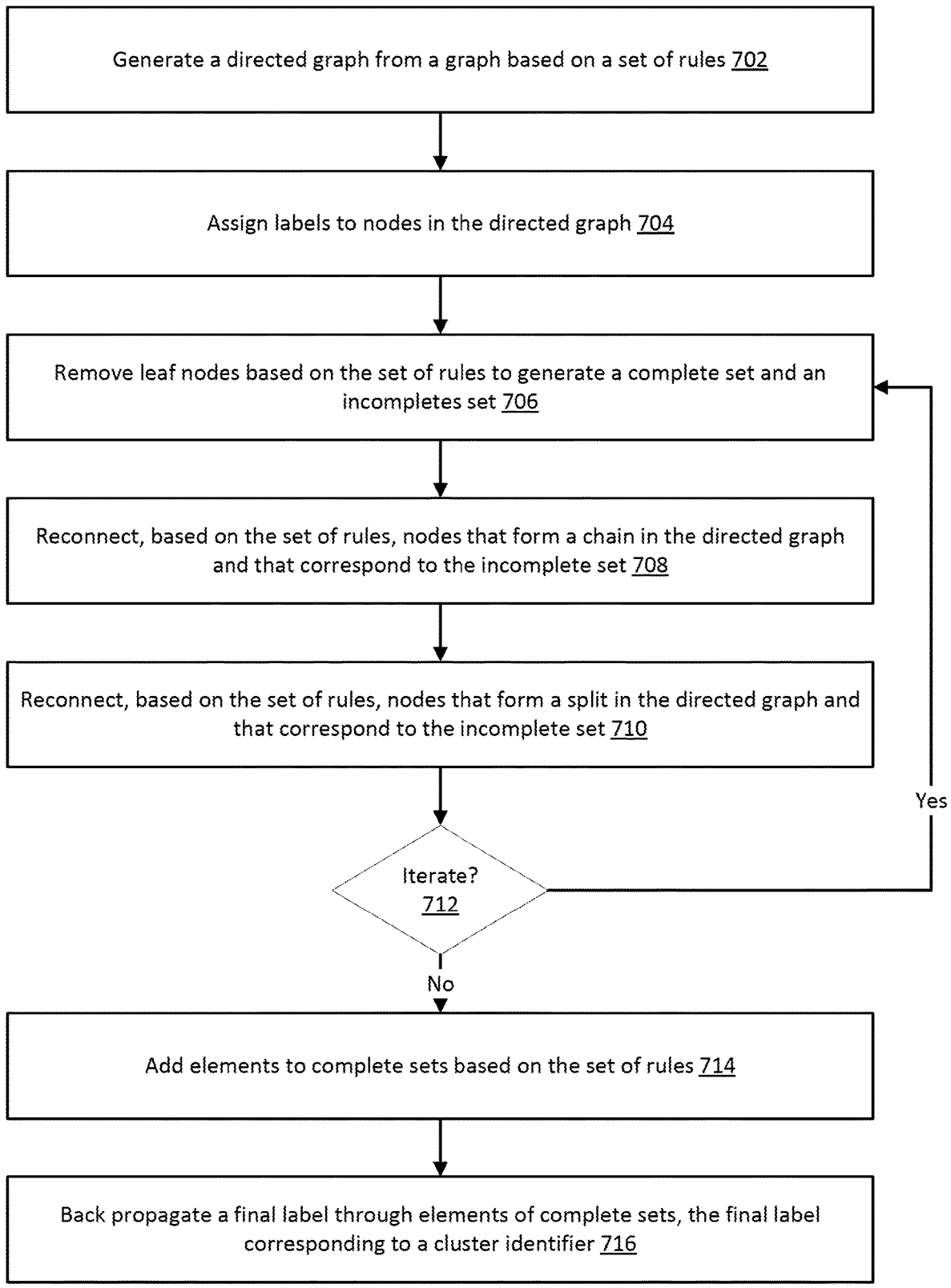
FIG. 7 illustrates an example of a flow for clustering data based on a directed graph representation according to embodiments of the present disclosure.

FIGS. 6 and 7 illustrate examples of flows for clustering data. These flows are illustrated in connection with data representative of online activities of clients and of clustering of nodes that represent device identifiers of computing devices used to perform such activities (e.g., to access online services that provide the online activities). However, the flows are not limited as such and similarly apply to any type of data used in a directed graph representation. A computing system may be configured to perform the illustrative flows. For example, the computing system can be a distributed computing system that hosts the clustering platform 120 of FIG. 1, in some embodiments. Instructions for performing the operations of the illustrative flows can be stored as computer-readable instructions on a non-transitory computer-readable medium of the computing system. As stored, the instructions represent programmable modules that include code or data executable by a processor(s) of the computing system. The execution of such instructions configures the computing system to perform the specific operations shown in the figures and described herein. Each programmable module in combination with the processor represent a means for performing a respective operation(s). While the operations are illustrated in a particular order, it should be understood that no particular order is necessary and that one or more operations may be omitted, skipped, and/or reordered.

FIG. 6 illustrates an example of a flow for clustering data and providing a customized computing service according to embodiments of the present disclosure. The example flow starts at operation 602, where the computing system accesses a directed graph. The directed graph is generated based on data associated with online activities of computing devices. The online activities represent various interactions of clients with computing services that provide or facilitate such activities. The directed graph includes nodes and oriented edges connecting the nodes. Each node represents a device identifier associated with one of the computing devices. In an example, the directed graph is accessed from memory local to the computing system. In another example, the directed graph is accessed based on import of the directed graph to the computing system from a third party computing resource. In yet another example, a bipartite graph is available from memory (local to the computing system or to the third party computing resource). The computing system accesses the bipartite graph and applies a partition rule thereto to generate the directed graph.

At operation 604, the computing system generates clusters that contain subsets of the nodes by at least iteratively updating the directed graph based on a set of rules. Various rules are possible. In an example, the set of rules specify (a) removal of leaf nodes from the directed graph, (b) reconnection of nodes that form a chain in the directed graph, and (c) reconnection of nodes that form a split in the directed graph. The set of rules can also include a global rule that specifies how labels are assigned to nodes and how key-value pairs are generated and stored in memory of the computing system to capture the nodes and the oriented edges of the directed graph. Further, the set of rules can include the partition rule. The iterative clustering based on the various rules is further described in connection with the next figures. Once the iterations are complete, the various clusters are generated. Each cluster contains a specific subset of nodes based on these nodes having formed a union star centered around the same, single "parent node" according to the set of rules. The identifier of the cluster is the final label propagated to the nodes in the union star (e.g., the label of the "parent node").

At operation 606, the computing system associates a client profile with a subset of the nodes contained a cluster from the clusters. In an example, each cluster corresponds to a client profile. The computing system determines that at least one of the device identifiers represented by a node of the cluster corresponds to the client profile based on prior knowledge about the relationship between the device identifier and the client profile (e.g., a cookie represented in a node of the cluster was previously detected as belonging to a client having the client profile). Associating the cluster with the client profile includes, for instance, adding the identifier of the cluster as an entry to the client profile. In another illustration, the associating includes adding the various device identifiers as entries to the client profile. The client profile can be stored on the local memory of the computing system and/or at a remote computing resource.

At operation 608, the computing system determines that a device identifier associated with a computing device corresponds to a node from the subset of nodes contained in the cluster. For example, the client operates the computing device to access a computing service that facilitates an online activity. The access is facilitated by the device identifier. The computing system detects the device identifier and uses it to look up the various clusters. The device identifier matches a device identifier represented in the node of the cluster. Accordingly, the computing system determines that the device identifier has a match with the cluster and, thus, associated the access of the computing device to the computing service with the client profile.

At operation 610, the computing system customizes the online activity of the computing device associated with device identifier. In an example, the online activity is customized according to the client profile based on the determination that the device identifier corresponds to the node from the subset of nodes associated with the client profile. For instance, the computing system retrieves user preferences or a history of customization from the client profile and inserts targeted content in the online activity or customizes the look and feel of this activity.

FIG. 7 illustrates an example of a flow for clustering data based on a directed graph representation according to embodiments of the present disclosure. Operations of the example flow are described in connection with the illustrations of FIGS. 8-10 in the interest of clarity of explanation.

The example flow starts at operation 702, where the computing system generates a directed graph from a graph based on a set of rules. In an example, the graph is accessed from memory of the computing system or from a remote network storage location. The accessed graph can be a directed graph, an undirected graph, or a bipartite graph. If the accessed graph is already a directed graph, no further processing is needed at operation 702 and operation 704 follows operation 702 to label the nodes and, as needed, re-orient the edges. If the accessed graph is an undirected graph, the set of rules include a global rule that specifies how the directed graph should be generated from the undirected graph. For instance, labels are assigned to the nodes of the undirected graph and the existing edges (which are not oriented) become oriented based on the labels (e.g. from a larger node to a smaller neighboring node) to generate the directed graph. If the accessed graph is a bipartite graph, the set of rules also includes a partition rule that specifies how nodes within one partition of interest graph should be connected based on connections between the partitions of the bipartite graph. For instance, the global rule and the partition rule 510 described in connection with FIGS. 4 and 5 are applied to the various nodes in the partition of interest.

At operation 704, the computing system assigns labels to the nodes in the directed graph. As explained in connection with operation 702, if an undirected graph is initially accessed, operations 702 and 704 can be performed in conjunction to generate the directed graph. Otherwise, operation 704 follows operation 702. Further, if the directed graph is initially accessed at operation 702, the edges connecting the nodes can be re-oriented according to the global rule (e.g., oriented edges connect larger nodes to smaller neighboring nodes). In the example label assignment 802 of FIG. 8, a numerical value is used as a label. Each node is assigned a different numerical value. Assigning the labels can also include storing key-value pairs in memory of the computing system. A key of a key-value pair represents a first label of a first node. A value of the key-value pair represents a second label of a second node, where an oriented edge connects the two nodes in the directed graph. The global rule is applied to generate such key-value pairs. The global rule specifies that the key and the value in each key-value pair are stored based on a numerical value of a label corresponding to the key being smaller than a numerical value of a label corresponding to the value. Referring to the label assignment 802, a key-value pair is generated and stored for nodes "1" and "8." The key of this pair is "1" and the value is "8."

At operation 706, the computing system removes leaf nodes based on the set of rules to generate a complete set and an incomplete set in the current clustering iteration. In the example leaf removal 804 of FIG. 8, node "9" is a leaf node as it does not have any oriented edge directed to it. Accordingly, node "9" is removed. At the start of the current clustering iteration, each of the complete set and empty set is empty. Removing a leaf node (e.g., node "9") includes adding its label (e.g., "9") to the complete set. At the end of the leaf removal, the labels of the remaining nodes are added to the incomplete set. This incomplete set represents a subset of the directed graph for additional processing under the chain, split, and star rules. The complete set is not subject to this additional processing. When a key-value representation is used, removal of a leaf node includes storing in the complete set a key-value pair having a label of the leaf node as a key of the key-value pair and having a label of a node connected to the leaf node as a value of the key-value pair.

In an example, the key-value pairs are used to identify the leaf nodes. For instance, the computing system generates a set of reversed key-value pairs by reversing the order of the key and the value in each of the key-value pairs (e.g., the pair of "8"→"9" becomes "9"→"8"). The computing system also generates a candidate set of key-value pairs by removing a reversed key-value pair from the set of reversed key-value pairs based on a determination that a key of the reversed key-value pair is common with at least another reversed key-value pair (e.g., that this key appears at least twice in the reversed key-value pairs). For instance, the key "8" appears in the reversed "8"→"1" pair and in the reversed "8"→"7" pair. Thus, both of these reversed pairs are removed and are not part of the candidate set. The computing system identifies each leaf node by subtracting the original key-value pairs from the candidate set of key-value pairs based on keys of the key-value pairs and of the candidate set. The subtraction uses the keys and not the values. A leaf node corresponds to a key of a key-value pair that remains in the candidate set after the subtraction. For example, after the subtraction, the candidate set consists of the reversed "9"→"8" pair. Accordingly, node "9" is a leaf node and is removed (by adding it to the complete set).

In an example, removing the leaf nodes account for data skews. A data skew is exhibited by a large number of key-value pairs having a same key. A threshold can be used to identify the data skew and accordingly remove the leaf nodes. For instance, the threshold is set to one thousand or some other value. If the frequency of appearance of a key in the key-value pairs is less than the threshold, the above subtraction by key is applied to identify and remove a leaf node. However, if the frequency is larger than the threshold, the computing system removes a subset of the key-value pairs that contain the key to generate a remaining set of key-value pairs. Effectively, the "large key" is filtered out. The computing system then generates the set of reversed key-value pairs and the candidate set based on the remaining set of key-value pairs. And the computing system subtracts the subset of the key-value pairs from the key-value pairs.

The above leaf removal sub-operations can be implemented by using the following pseudo-code. A description of the pseudo-code is also provided thereafter.

```
def pruneLeaves(edges: DirectedEdgeRDD): (DirectedEdgeRDD,
DirectedEdgeRDD) = {
  val reverseEdges = edges.map(_.swap)
  // Candidates: nodes that have a single "child" edge - plus the
     associated edge, i.e., filter-away
  cases like this (all edges starting from node 3): 1 <- 3 -> 2
  val candidates = reverseEdges
    .reduceByKey((x, y) => if (x == y) x else Long.MaxValue)
    .filter(_._2 != Long.MaxValue)
  val isNotLoop = (e: (Long, Long)) => e._1 != e._2
  // Candidates are reverse edges - keyed off the parent, not the child. By
  subtracting (by key) the forward edges, we eliminate the nodes that are
  "in the middle"of two edges, i.e., are part of the chain. i.e., filer-away
  cases like this (all edges starting from node 2): 1 <- 2 <- 3
  val complete = dynamicSubtractByKey(candidates,
    edges.filter(isNotLoop))
    .map(_.swap)
  /* A "plain subtract" is inefficient & fails on skewed data. Instead, use
```

```
"dynamicSubtractByKey" since we know that leaves have only one child
(by definition) - we can subtract by key the reversed leaf edges from the
reversed edges and that's the same as a regular subtract */
   val incomplete = dynamicSubtractByKey(reverseEdges,
   complete.map(_.swap))
     .map(_.swap)
   (complete, incomplete)
}
```

The "pruneLeaves" method identifies all the nodes that do not have any incidental edges (they are not on the left hand side of any pair), and have only one outgoing edge. It then puts all the edges that start from the leaf nodes (edges that have a leaf node on the right hand side) into the "complete" set, and all the other edges into the "incomplete" set. The pruneLeaves method first computes "candidate edges"— edges that may be complete, because their "large label" has only one child (e.g., the label does not appear on the right hand side of more than one node). It does so by reversing the edges (so that the large label becomes a "key"), and then performing a very efficient "reduceByKey" operation. After the "candidates" is generated, the "complete" set is computed by subtracting from the set of candidate edges, the original edges (except the self-loop). The "candidate" edges are reversed, so "large label" would be on the left hand side (it is the key, in the (key, value) pair). When subtracting by key, the nodes where a large label was part of an edge chain is removed from the candidates list. Finally, the set of "incomplete" edges is obtained by removing the "complete" edges from the initial set. Here, a SutractByKey operation (on the reversed edges) can be performed because, by construction, all the edges in the "complete" set have a key ("large label") that appears once, and only once in the initial input set.

The "dynamicSubtractByKey" procedure is used to handle skewed data. Since the sometimes data may actually be skewed (lots of nodes having the same key), a custom procedure of subtracting two sets (by key) is used. The pseudo-code of the dynamicSubtractByKey procedure is:

```
private[this] def dynamicSubtractByKey(rdd1: DirectedEdgeRDD,
rdd2: DirectedEdgeRDD):
DirectedEdgeRDD = {
   val count = rdd2.keys.countApproxDistinct( )
   if (count <= broadcastThreshold) {
     val (_, keyNotInRDD2) = setPredicates(rdd2.collectDistinctKeys( ))
     rdd1.filter(keyNotInRDD2)
   } else {
     val largeKeys1 =
     rdd1.countByKeyRDD( ).filter(isHugeCluster).keys.collect( ).toSet
     val largeKeys2 =
     rdd2.countByKeyRDD( ).filter(isHugeCluster).keys.collect( )
     val (key1IsLarge, key1IsSmall) = setPredicates(largeKeys1)
     val (_, key2IsSmall) = setPredicates(largeKeys2)
     val smallRDD1 = rdd1.filter(key1IsSmall)
     val smallRDD2 = rdd2.filter(key2IsSmall)
     val smallKeysResult =
     smallRDD1.subtractByKey(smallRDD2).filter(key2IsSmall)
     val largeKeysfromRDD1FoundInRDD2 =
     rdd2.filter(key1IsLarge).collectDistinctKeys( )
     val largeKeysInResult =
     largeKeys1.diff(largeKeysfromRDD1FoundInRDD2)
     val (largeKeysPredicate, _) = setPredicates(largeKeysInResult)
     val largeKeysResult = rdd1.filter(largeKeysPredicate)
     (smallKeysResult union largeKeysResult)
   }
}
```

In this pseudo-code, leaf removal is handled differently based on the frequency of the appearance of a label relative to a threshold. If the second set has a small number of keys—it just broadcasts all the keys from set rdd2 to all computers of the computing system and, thus, enables a very efficient filtering of all pairs from set rdd1 that have keys that exist in set rdd2 (thus achieving the "subtractByKey"). On the other hand, if the number of keys is large, different procedure is applied: the set of "large keys" are identified (keys that appear on the left hand side at a frequency exceeding the threshold). Those large keys are presumed to be relatively few and can be filtered away, thereby effectively reducing "rdd1" into "smallRDD1" and "rdd2" into "smallRDD2". These are potentially very large sets of edges, but in each of those sets, any one given key has relatively few associated values, so that the regular "subtractByKey" operation can be properly performed between smallRDD1 and smallRDD2, resulting in the "smallKeyResult". The other part of the result is obtained based on the insight that the largeKeyResult may also have many edges, but has by construction relatively few distinct keys. So, all the distinct keys are collected, the subtraction is performed as a regular set subtraction to identify which one(s) of the large keys need to be in the final result. The set of "largeKeysInResult" can be broadcasted to all the computers in the cluster, and a very efficient, distributed filtering of rdd1 is performed so that it only contains the edges from that set to obtain largeKeyResult. Finally, the two partial results are used to identify and remove the leaf nodes.

At operation 708, the computing system reconnects, based on the set of rules, nodes that form a chain in the directed graph and that correspond to the incomplete set. In an example, the leaf nodes that were removed are not considered for the reconnection. Instead, the chain rule is applied to the nodes as represented in the incomplete set. In the example reconnection of nodes forming a chain 902 of FIG. 9, nodes "8," "7," and "3" form a first chain connection, and nodes "6," "3," and "2" form a second chain connection. Accordingly, nodes "8" and node "3" become connected, nodes "7" and "2" become connected, and nodes "6" and node "2" become connected, as illustrated with dotted lines. The connections between nodes "8" and "7," "7" and "3," and "6" and "3" are removed. When a key-value representation is used, reconnecting a node to another node of a chain includes storing in an incomplete set a key-value pair having a label of the node as a key of the key-value pair and having a label of the other node as a value of the second key-value pair.

At operation 710, the computing system reconnects, based on the set of rules, nodes that form a split in the directed graph and that correspond to the incomplete set. In an example, the leaf nodes that were removed are not considered for the reconnection. Instead, the split rule is applied to the nodes as represented in the incomplete set, after the incomplete set (and, equivalently, the directed graph) is updated per the chain rule as described in connection with operation 708. In the example, reconnection of nodes forming a split 904 of FIG. 9, nodes "7," "1," and "5" form a first split connection, and nodes "6," "2," and "4" form a second split connection. Accordingly, nodes "5" and "3" becomes connected, nodes "7" and "2" become connected, and nodes "6" and "2" become connected to node "1", as illustrated with dotted lines. Likewise, node "4" becomes connected to node "2." The connections between node "8" to nodes "3" and "5" and between nodes "4" and "4" are removed. When a key-value representation is used, reconnecting a node to another node of a split includes storing in an incomplete set a key-value pair having a label of the node as a key of the key-value pair and having a label of the other node as a value of the second key-value pair.

At operation 712, the computing system determines whether the leaf removal and node reconnection operations should be iterated again. In an example, one or more parameters can be considered for this determination. A first parameter is the number of the current iteration relative to a total number "N." If the number of the current iteration is smaller, operation 706 follows operation 710. Otherwise, operation 714 is performed. A second parameter is convergence. Convergence can occur when no changes occur to either the complete set or the incomplete set from the past iteration to the current iteration. If convergence occurs, operation 714 follows operation 712. Otherwise, operation 706 is performed.

Various types of iterations are also possible. In an example, a global iteration cycle is performed by iterating between leaf removals, reconnections of nodes that form chains, and reconnections of nodes that form a split. In other words, operation 706 is performed once, followed by performing operation 708 once, and finally followed by performing operation 710 once in each iteration of the global iteration cycle. In another example, a local iteration cycle is performed by iteration between leaf removals, followed by iterating between reconnections of nodes that form chains, finally followed by iterating reconnections of nodes that form a split. In other words, operation 706 is performed iteratively, followed by performing operation 708 iteratively, and finally followed by performing operation 710 iteratively, where each operation is iteratively repeated according to one or a combination of the above factors.

Figure 10:
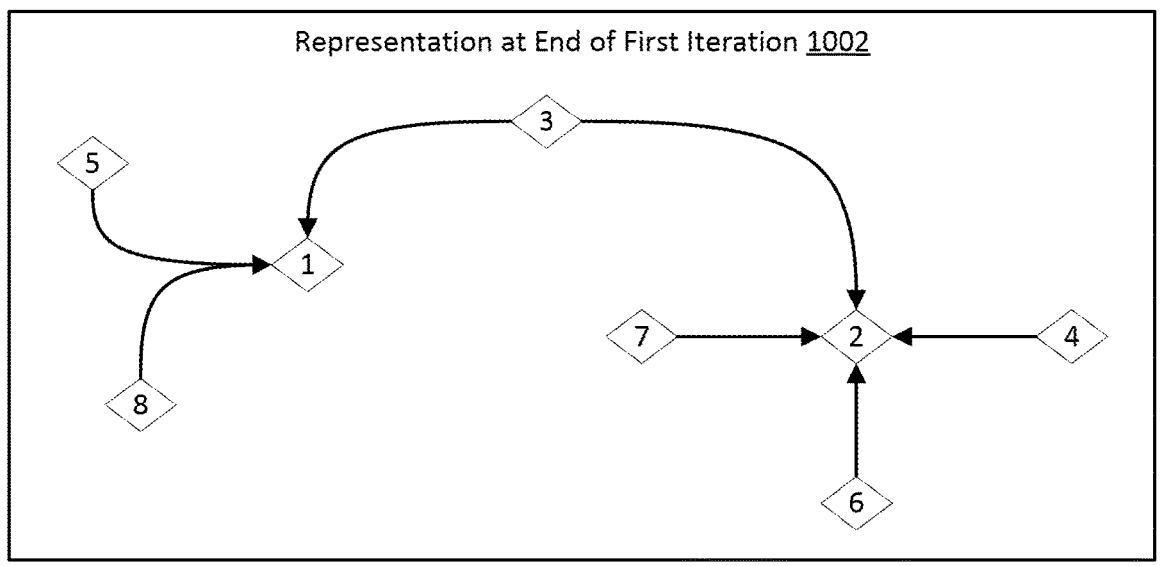
FIG. 10 illustrates an example of iteratively representing nodes in a directed graph according to embodiments of the present disclosure.
Figure 10:
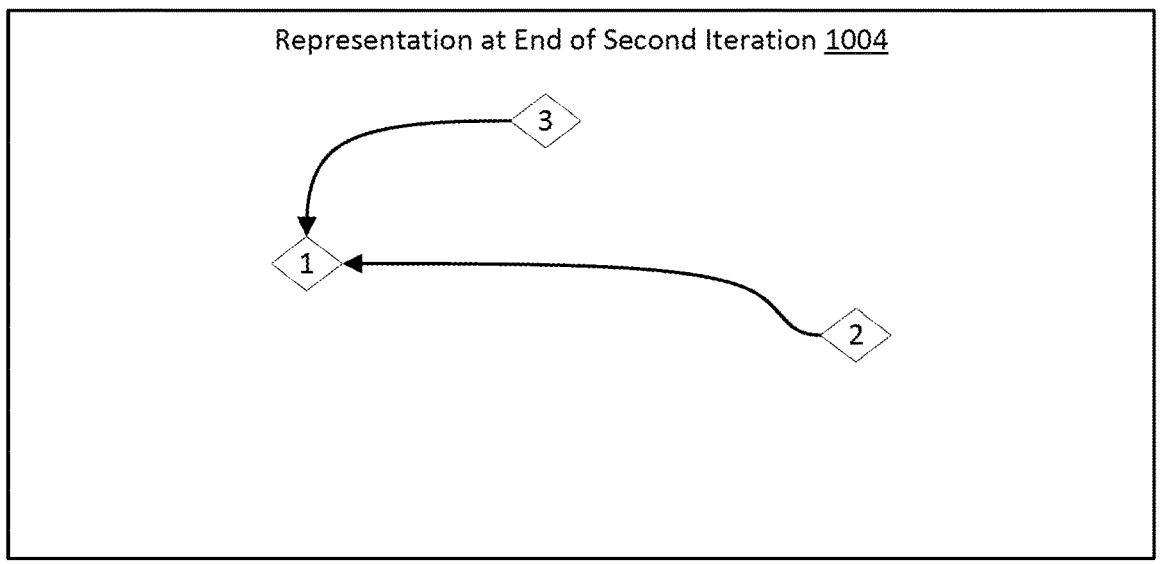

The presentations of FIG. 10 illustrate the use of the global iteration cycle. Here, this cycle includes two iterations. In the representation at the end of the first iteration 1002, leaf node "9" has been removed and the remaining nodes have been reconnected in the directed graph. Nodes "4," "5," "6," 7," and "8" have become leaf nodes. In the representation at the end of the second iteration 100, leaf nodes "4," "5," "6," "7," and "8" have been removed and the remaining nodes have been reconnected in the directed graph to form a star connection from node "3" to node "1" and from node "2" to node "1." Hence, node "1" is the same, single parent node that the various nodes could be connected to in a union of stars. The label "1" could be used as the final label of the union of stars (and, equivalently, the identifier of the cluster).

At operation 714, the computing system applies the set of rules to add elements to complete sets. In an example, any leaf nodes are added to a complete set (e.g., leaf nodes "4," "5," "6," "7," and "8"). The star rule is applied to maintain the resulting star connection. Leaf nodes of this star connections can also be removed and added to a second complete set (e.g., leaf nodes "3" and "2"). The remaining node (e.g., node "1") represents the same, single parent node to which the various nodes could are connected.

At operation 716, the computing system back propagates the final label through elements of the complete sets that were generated at each of the clustering iterations. A complete set of a clustering iteration includes element(s) (e.g., key-value pair(s)) corresponding to leaf node(s) that were removed. At this operation, the computing system composes back the intermediate results (the elements in these sets) into the union of stars. In an example, the back propagation starts from the last iteration and moves back to the first iteration. In this example, the final label is propagated based on matching a value from a key-value pair from a complete set at one clustering iteration with a key of another key-value pair from a complete set at the preceding clustering iteration. This key corresponds to the final label.

Figure 8:
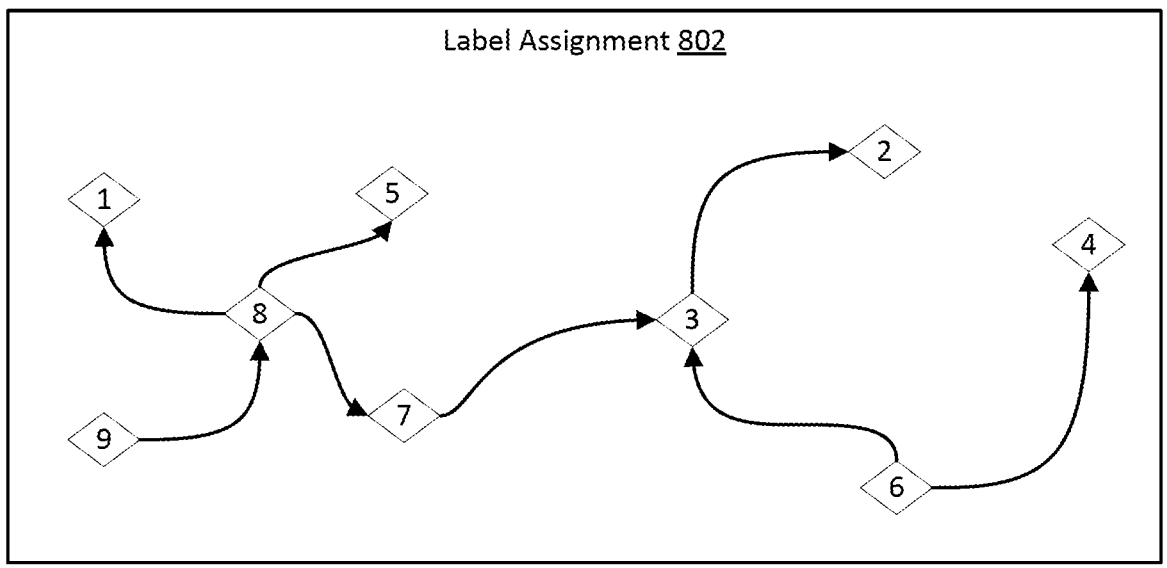
FIG. 8 illustrates an example of assigning labels and removing nodes in a directed graph according to embodiments of the present disclosure.
Figure 8:
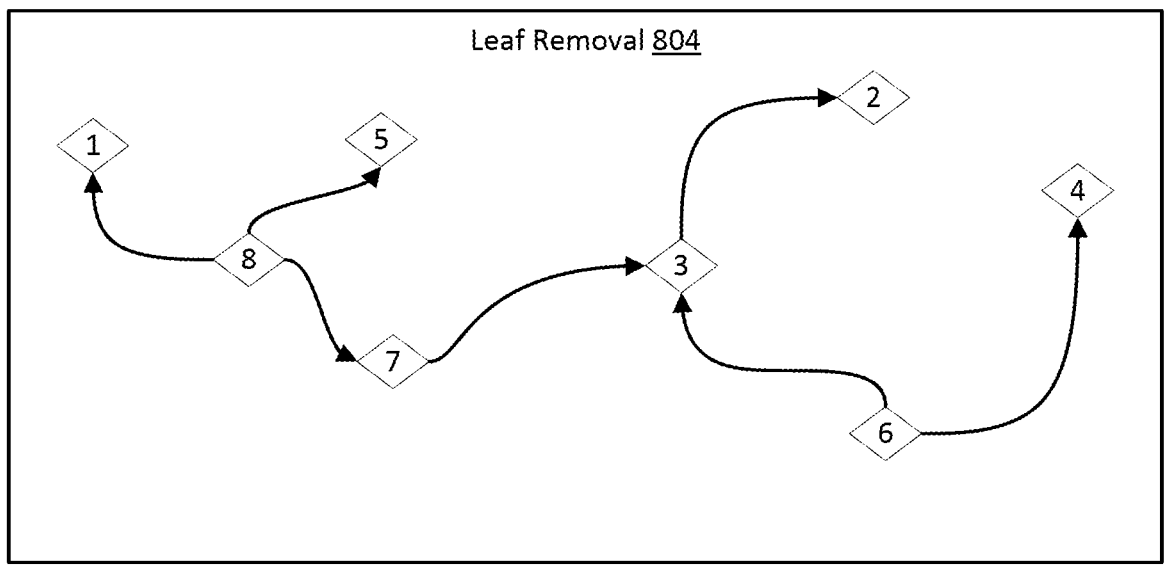
Figure 9:
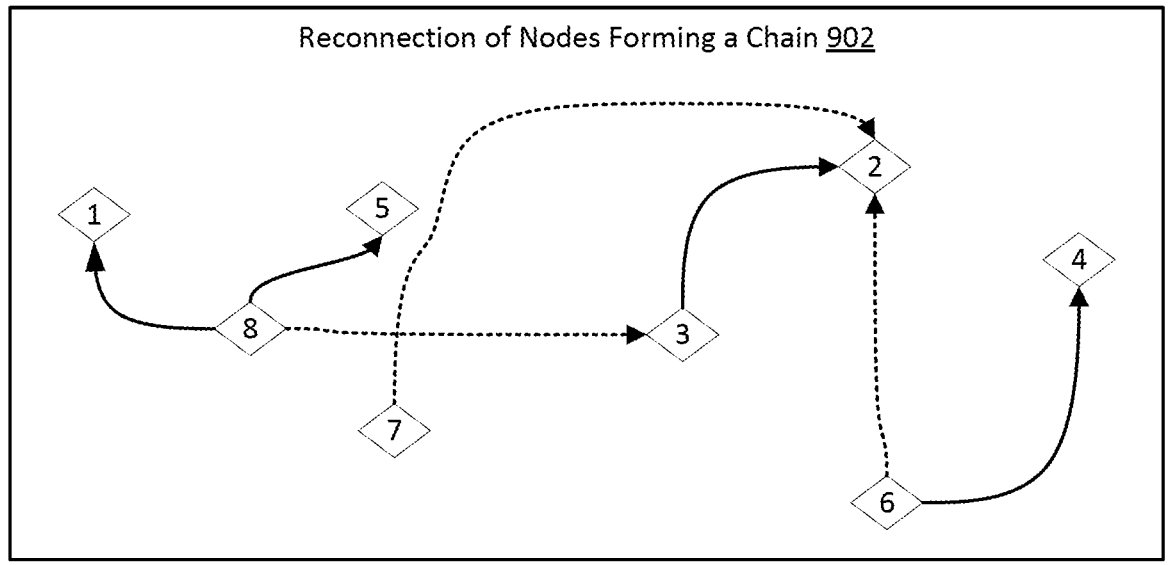
FIG. 9 illustrates an example of reconnecting nodes in a directed graph according to embodiments of the present disclosure.
Figure 9:
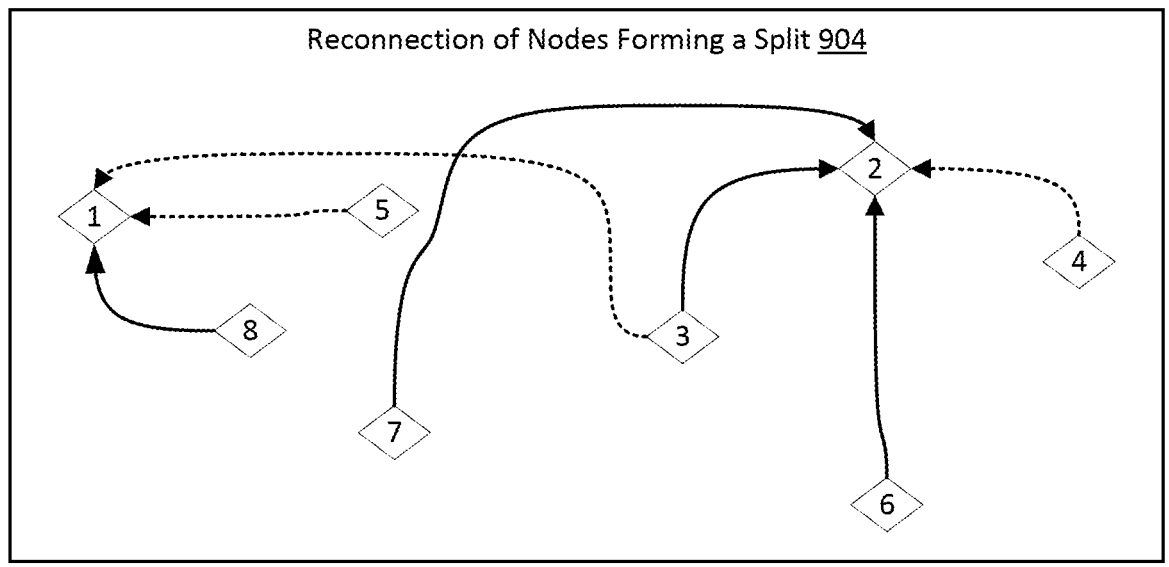

Referring to the illustrations of FIGS. 8-10, at the end of the first iteration, node "9" is removed, resulting in a first complete set of "9"→"7." At the end of the second iteration, nodes "4," "5," "6," "7," and "8" are removed, resulting in a second complete set of "5"→"1," "8"→"1," "7"→"2," "6"→"2," and "4"→"2." When the set of rules, including the star rule, are applied, nodes "3" and "2" are removed, resulting in a third complete set "3"→"1" and "2"→"1." At the end, only node "1" remains, resulting in the fourth complete set "1"→"1."

The right hand side of this last-generated complete set is interpreted as the final label. The final label is propagated backwards through the other complete sets. The backpropagation matches keys from the later-generated complete sets with values of earlier-generated complete sets. In the first backpropagation iteration, the key "1" from the fourth and last complete set is matched with the values from the third complete set resulting in a first backpropagation set "3"→"1," "2"→"1," and "1"→"1." In the second backpropagation iteration, each of the keys "1" and "2" from the first backpropagation set is matched with the values from the second complete set resulting in a second backpropagation set "5"→"1," "8"→"1," "7"→"1," "6"→"1," "4"→"1," "3"→"1," "2"→"1," and "1"→"1." Similarly, in the third backpropagation iteration, key "8" from the second backpropagation set is matched with the value from the first complete set resulting in a final backpropagation set "9"→"1," "5"→"1," "8"→"1," "7"→"1," "6"→"1," "4"→"1," "3"→"1," "2"→"1," and "1"→"1." The backpropagation is complete, and "1" represents the final label of the union of stars. The final backpropagation set is interpreted such that node "9" is in cluster "1," node "5" is in cluster "1," and so on and so forth.

Figure 11:
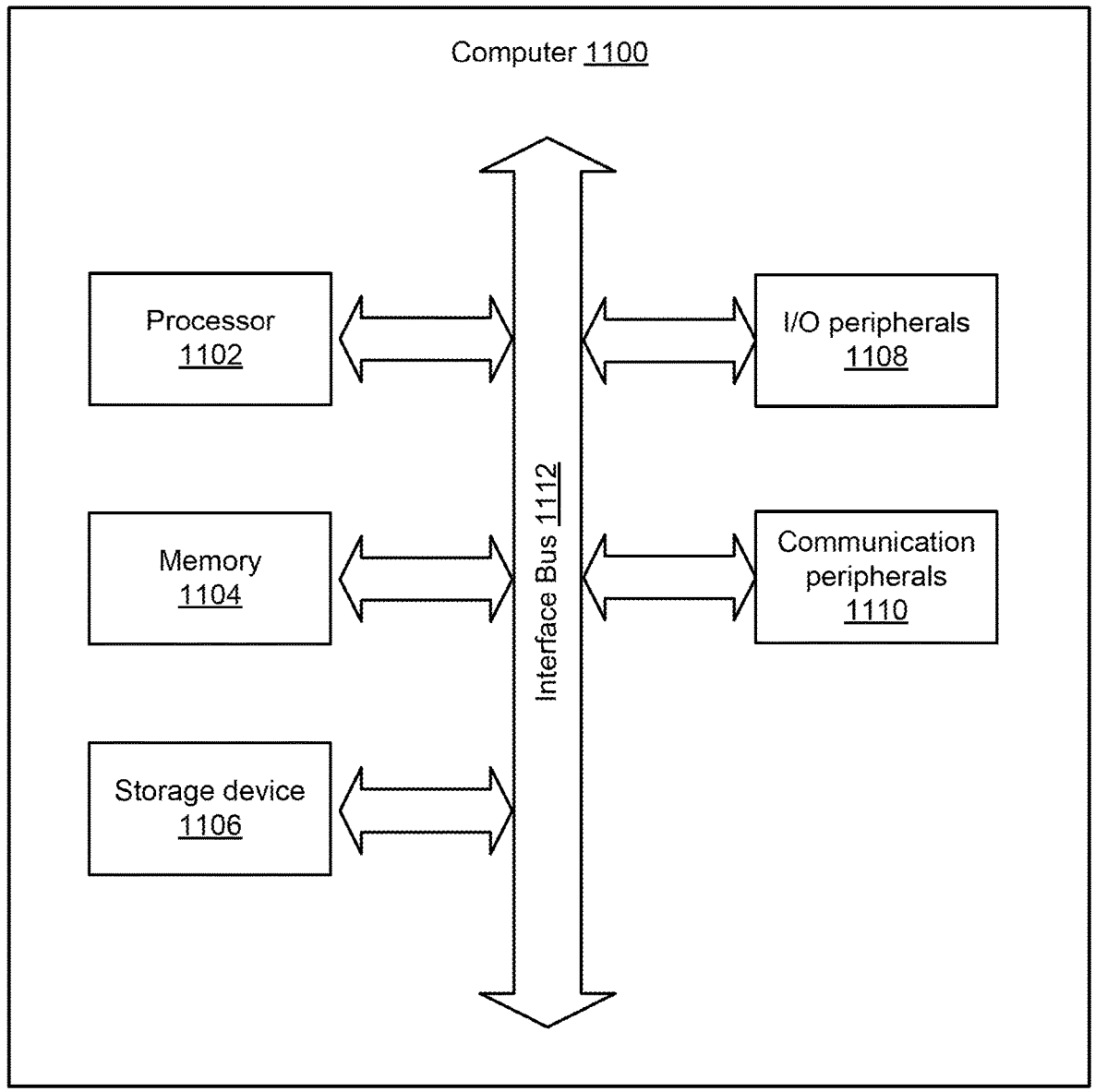
FIG. 11 illustrates examples of components of a computer that belongs to a distributed computing system according to certain embodiments.

FIG. 11 illustrates examples of components of a computer 1100 that belongs to a distributed computing system, according to certain embodiments. The computer 1100 includes at least a processor 1102, a memory 1104, a storage device 1106, input/output peripherals (I/O) 1108, communication peripherals 1110, and an interface bus 1112. The interface bus 1112 is configured to communicate, transmit, and transfer data, controls, and commands among the various components of the computer 1100. The memory 1104 and the storage device 1106 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer-readable storage media can be configured to store instructions or program codes embodying aspects of the disclosure. The memory 1104 and the storage device 1106 also include computer-readable signal media. A computer-readable signal medium includes a propagated data signal with computer-readable program code embodied therein. Such a propagated signal takes any of a variety of forms including, but not limited to, electromagnetic, optical, or any combination thereof. A computer-readable signal medium includes any computer-readable medium that is not a computer-readable storage medium and that can communicate, propagate, or transport a program for use in connection with the computer 1100.

Further, the memory 1104 includes an operating system, programs, and applications. The processor 1102 is configured to execute the stored instructions and includes, for example, a logical processing unit, a microprocessor, a digital signal processor, and other processors. The memory 1104 and/or the processor 1102 can be virtualized and can be hosted within another computing system of, for example, a cloud network or a data center. The I/O peripherals 1108 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 1108 are connected to the processor 1102 through any of the ports coupled to the interface bus 1112. The communication peripherals 1110 are configured to facilitate communication between the computer 1100 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computing systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A computer-implemented method for large-scale graph clustering, the computer-implemented method performed on a computing system and comprising:

accessing, by a clustering module hosted on the computing system, a directed graph generated based on data associated with online activities of computing devices, the directed graph comprising nodes and oriented edges connecting the nodes, each node representing a device identifier associated with one of the computing devices;

generating, by the clustering module, clusters that contain subsets of the nodes by at least iteratively updating the directed graph based on a set of rules, the set of rules specifying (i) removal of leaf nodes from the directed graph, (ii) reconnection of nodes that form a chain in the directed graph, and (iii) reconnection of nodes that form a split in the directed graph;

associating, by a profile module hosted on the computing system, a client profile with a subset of the nodes contained in a cluster from the clusters; and customizing, by a client service module hosted on the computing system, an online activity of a computing device associated with a device identifier, the online activity customized according to the client profile based on a determination that the device identifier corresponds to a node from the subset of nodes associated with the client profile.

2. The computer-implemented method of claim 1, wherein the set of rules specify that, in a chain of nodes where oriented edges connect a first node to a second node and the second node to a third node, the first node should be reconnected to the third node, the oriented edge between the first node and the second node should be removed, and the oriented edge between the second node and the third node should be preserved.

3. The computer-implemented method of claim 1, wherein the set of rules specify that, in a split of nodes where oriented edges connect a first node to a second node and to a third node, the second node should be reconnected to the third node, the oriented edge between the first node and the second node should be removed, and the oriented edge between the first node and the third node should be preserved.

4. The computer-implemented method of claim 1, wherein the set of rules further specify that oriented edges connecting nodes that form a star in the directed graph should be preserved, wherein the star is formed when oriented edges connect each of a first node and a second node to a third node.

5. The computer-implemented method of claim 1, wherein the data is represented first in an undirected graph or a bipartite graph, and wherein representing the data in the directed graph comprises generating the directed graph from the undirected graph or the bipartite graph based on the set of rules.

6. The computer-implemented method of claim 5, wherein the directed graph is generated from the bipartite graph based on the set of rules specifying (i) a selection of a partition of interest from the bipartite graph and (ii) a minimum number of oriented edges to be maintained for the nodes in the directed graph based on connections between the nodes and a second partition of the bipartite graph.

7. The computer-implemented method of claim 6, wherein the set of rules specifies that, in the directed graph, a first oriented edge connects a first node to the first node from the partition of interest and a second oriented edge connects the first node to a second node from the partition of interest based on connections of the first node and the second node with a common node in the second partition.

8. The computer-implemented method of claim 1, further comprising:
    assigning a label to each node; and
    storing key-value pairs that correspond to the nodes and oriented edges, wherein a key of a key-value pair represents a first label of a first node, wherein a value of the key-value pair represents a second label of a second node, wherein an oriented edge connects the first node to the second node in the directed graph.

9. The computer-implemented method of claim 8, wherein the labels are numerically assigned, and wherein the key and the value in each key-value pair are stored based on a numerical value of a label corresponding to the key being smaller than a numerical value of a label corresponding to the value.

10. The computer-implemented method of claim 8, wherein iteratively updating the directed graph based on the set of rules specifying the removal of the leaf nodes comprises:
    generating a set of reversed key-value pairs by reversing an order of a key and a value in each of the key-value pairs;
    generating a candidate set of key-value pairs by removing a reversed key-value pair from the set of reversed key-value pairs based on a determination that a key of the reversed key-value pair is common with at least another reversed key-value pair; and
    identifying a leaf node by subtracting the key-value pairs from the candidate set of key-value pairs based on keys of the key-value pairs and of the candidate set.

11. The computer-implemented method of claim 10, wherein iteratively updating the directed graph further comprises:
    identifying that a key appears in the key-value pairs at a frequency that exceeds a threshold;
    removing a subset of the key-value pairs that contain the key to generate a remaining set of key-value pairs, wherein the set of reversed key-value pairs and the candidate set are generated based on the remaining set of key-value pairs; and
    subtracting the subset of the key-value pairs from the key-value pairs.

12. The computer-implemented method of claim 1, wherein iteratively updating the directed graph based on the set of rules comprises reconnecting the nodes that form the chain and reconnecting the nodes that form the split in the directed graph after the removal of the leaf nodes from the directed graph.

13. The computer-implemented method of claim 1, wherein removal of a leaf node comprises forming a complete set that contains the leaf node and an incomplete set, and wherein nodes are reconnected by applying the set of rules to the incomplete set.

14. A computing system comprising:
    means for accessing a directed graph generated based on data associated with online activities of computing devices, the directed graph comprising nodes and oriented edges connecting the nodes, each node representing a device identifier associated with one of the computing devices;
    means for generating clusters that contain subsets of the nodes by at least iteratively updating the directed graph based on a set of rules, the set of rules specifying (i) removal of leaf nodes from the directed graph, (ii) reconnection of nodes that form a chain in the directed graph, and (iii) reconnection of nodes that form a split in the directed graph;
    means for associating a client profile with a subset of the nodes contained in a cluster from the clusters; and
    means for customizing an online activity of a computing device associated with a device identifier, the online activity customized according to the client profile based on a determination that the device identifier corresponds to a node from the subset of nodes associated with the client profile.

15. The computing system of claim 14, wherein iteratively updating the directed graph comprises iterating between reconnections of nodes that form chains and reconnections of nodes that form a split.

16. A non-transitory computer-readable storage medium comprising instructions that, upon execution on a computing system, configure the computing system to perform operations comprising:
- accessing a directed graph generated based on data associated with online activities of computing devices, the directed graph comprising nodes and oriented edges connecting the nodes, each node representing a device identifier associated with one of the computing devices;
- generating clusters that contain subsets of the nodes by at least iteratively updating the directed graph based on a set of rules, the set of rules specifying (i) removal of leaf nodes from the directed graph, (ii) reconnection of nodes that form a chain in the directed graph, and (iii) reconnection of nodes that form a split in the directed graph;
- associating a client profile with a subset of the nodes contained in a cluster from the clusters; and
- customizing an online activity of a computing device associated with a device identifier, the online activity customized according to the client profile based on a determination that the device identifier corresponds to a node from the subset of nodes associated with the client profile.

17. The non-transitory computer-readable storage medium of claim 16, wherein iteratively updating the directed graph comprises iterating between reconnections of nodes that form chains and reconnections of nodes that form a split.

18. The non-transitory computer-readable storage medium of claim 16, wherein removal of a leaf node comprises storing in a complete set a key-value pair having a label of the leaf node as a key of the key-value pair and having a label of a node connected to the leaf node as a value of the key-value pair, and wherein reconnecting a node to another node of a chain or a split comprises storing in an incomplete set a second key-value pair having a label of the node as a key of the second key-value pair and having a label of the other node as a value of the second key-value pair.

19. The non-transitory computer-readable storage medium of claim 16, wherein the operations further comprise propagating, upon completion of the iterative updating of the directed graph, a final label as a cluster identifier based on matching a value from a key-value pair with a key of another key-value pair, wherein the key corresponds to the final label.

* * * * *